US012301297B2

(12) United States Patent
Orhan et al.

(10) Patent No.: US 12,301,297 B2
(45) Date of Patent: May 13, 2025

(54) BEAM MANAGEMENT AND ANTENNA CALIBRATION IN MIMO SYSTEMS

(71) Applicant: Intel Corporation, Santa Clara, CA (US)

(72) Inventors: Oner Orhan, San Jose, CA (US); Hosein Nikopour, San Jose, CA (US); Shilpa Talwar, Cupertino, CA (US); Dor Shaviv, Fremont, CA (US); Roya Doostnejad, Los Altos, CA (US); Adesoji J. Sajuyigbe, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/656,063

(22) Filed: May 6, 2024

(65) Prior Publication Data

US 2024/0297723 A1  Sep. 5, 2024

Related U.S. Application Data

(62) Division of application No. 17/761,940, filed as application No. PCT/US2019/068730 on Dec. 27, 2019, now Pat. No. 12,009,875.

(51) Int. Cl.
*H04B 17/21* (2015.01)
*H04B 7/06* (2006.01)

(52) U.S. Cl.
CPC ........... *H04B 17/21* (2015.01); *H04B 7/0639* (2013.01); *H04B 7/0695* (2013.01)

(58) Field of Classification Search
CPC ..... H04B 17/21; H04B 7/0639; H04B 7/0695
See application file for complete search history.

(56) References Cited

U.S. PATENT DOCUMENTS

| 10,588,089 B1 | 3/2020 | Raghavan et al. |
| 12,009,875 B2 | 6/2024 | Orhan et al. |

(Continued)

FOREIGN PATENT DOCUMENTS

| CN | 115176423 A | 10/2022 |
| JP | 2003110476 A | 4/2003 |

(Continued)

OTHER PUBLICATIONS

"U.S. Appl. No. 17/761,940, Corrected Notice of Allowability mailed May 8, 2024", 2 pgs.

(Continued)

*Primary Examiner* — Jaison Joseph
(74) *Attorney, Agent, or Firm* — Schwegman Lundberg & Woessner, P.A.

(57) ABSTRACT

Millimeter-wave (mmWave) and sub-mmWave technology, apparatuses, and methods that relate to transceivers and receivers for wireless communications are described. The various aspects include an apparatus of a communication device including an antenna array and processing circuitry coupled to the antenna array. The processing circuitry is configured to initialize a beam tracking algorithm based on received signals received at the antenna array, wherein antenna phases used in the beam tracking are bound by an upper phase limit and a lower phase limit, to generate a beam tracking result. The processing circuitry is further configured to generate a calibration vector based on the beam tracking result and receive subsequent transmissions using a codebook adapted based on the calibration vector.

20 Claims, 24 Drawing Sheets

(56) References Cited

U.S. PATENT DOCUMENTS

| | | | |
|---|---|---|---|
| 2003/0098809 A1* | 5/2003 | Lindskog | H04B 7/12 342/51 |
| 2005/0135497 A1 | 6/2005 | Kim et al. | |
| 2014/0126620 A1 | 5/2014 | Maltsev et al. | |
| 2014/0169415 A1 | 6/2014 | Werner et al. | |
| 2015/0289147 A1 | 10/2015 | Lou et al. | |
| 2016/0043794 A1 | 2/2016 | Ashrafi et al. | |
| 2016/0255660 A1 | 9/2016 | Son et al. | |
| 2016/0285583 A1* | 9/2016 | Kasher | H04B 7/0695 |
| 2017/0035041 A1 | 2/2017 | Othon | |
| 2018/0115360 A1* | 4/2018 | Niknejad | H01Q 3/267 |
| 2018/0176869 A1 | 6/2018 | Aryafar et al. | |
| 2018/0192356 A1 | 7/2018 | Trainin et al. | |
| 2018/0199258 A1 | 7/2018 | Cezanne et al. | |
| 2018/0234867 A1 | 8/2018 | Wang et al. | |
| 2018/0302141 A1 | 10/2018 | Kutz et al. | |
| 2019/0013847 A1 | 1/2019 | Kim et al. | |
| 2019/0052326 A1 | 2/2019 | Lee et al. | |
| 2019/0296821 A1* | 9/2019 | Choi | H04B 7/00 |
| 2021/0076381 A1 | 3/2021 | Cao et al. | |
| 2021/0167996 A1 | 6/2021 | Ratnam et al. | |
| 2022/0345232 A1 | 10/2022 | Orhan et al. | |

FOREIGN PATENT DOCUMENTS

| | | |
|---|---|---|
| JP | 2008053933 A | 3/2008 |
| JP | 2019533948 A | 11/2019 |
| WO | WO-2021133412 A1 | 7/2021 |

OTHER PUBLICATIONS

"Japanese Application Serial No. 2022-520564, Notification of Reasons for Refusal mailed Jul. 30, 2024", w English Translation, 5 pgs.

U.S. Appl. No. 17/761,940, filed Mar. 18, 2022, Beam Management and Antenna Calibration in MIMO Systems.

"U.S. Appl. No. 17/761,940, Corrected Notice of Allowability mailed Mar. 6, 2024", 2 pgs.

"U.S. Appl. No. 17/761,940, Non Final Office Action mailed Aug. 17, 2023", 10 pgs.

"U.S. Appl. No. 17/761,940, Notice of Allowance mailed Jan. 31, 2024", 8 pgs.

"U.S. Appl. No. 17/761,940, Response filed Jun. 8, 2023 to Restriction Requirement mailed May 8, 2023", 6 pgs.

"U.S. Appl. No. 17/761,940, Response filed Nov. 17, 2023 to Non Final Office Action mailed Aug. 17, 2023", 9 pgs.

"U.S. Appl. No. 17/761,940, Restriction Requirement mailed May 8, 2023", 6 pgs.

"European Application Serial No. 19957313.0, Extended European Search Report mailed Aug. 3, 2023", 7 pgs.

"European Application Serial No. 19957313.0, Response filed Feb. 22, 2024 to Extended European Search Report mailed Aug. 3, 2023", 9 pgs.

"Indian Application Serial No. 202247014990, Response filed Aug. 23, 2023 to First Examination Report mailed Mar. 1, 2023", w/ English claims, 21 pgs.

"International Application Serial No. PCT/US2019/068730, International Preliminary Report on Patentability mailed Jul. 7, 2022", 9 pgs.

"International Application Serial No. PCT/US2019/068730, International Search Report mailed Nov. 20, 2020", 4 pgs.

"International Application Serial No. PCT/US2019/068730, Invitation to Pay Additional Fees and Partial Search Report mailed Sep. 24, 2020", 8 pgs.

"International Application Serial No. PCT/US2019/068730, Written Opinion mailed Nov. 20, 2020", 7 pgs.

"Japanese Application Serial No. 2022-520564, Notification of Reasons for Refusal mailed Jan. 9, 2024", w/ English Translation, 10 pgs.

"Japanese Application Serial No. 2022-520564, Response filed Apr. 8, 2024 to Notification of Reasons for Refusal mailed Jan. 9, 2024", w/ English claims, 15 pgs.

Alexandre, Chabory, et al., "Computation of electromagnetic scattering by multilayer dielectric objects using Gaussian beam based techniques", In: Comptes Rendus Physique, vol. 6, Issue 6, (Sep. 2005), 9 pgs.

Biglarbegian, Behzad, "Integrated Antennas and Active Beamformers Technology for mm-Wave Phased-Array Systems", PhD Thesis 63-67, (Jan. 1, 2012), 169 pgs.

Biglarbegian, Behzad, "Integrated Antennas and Active Beamformers Technology for mm-Wave Phased-Array Systems, PhD Thesis", ii-xviii [Online]. Retrieved from the Internet: <URL :https://uwspace.uwaterloo.ca/bitstream/handle/10012/6632/Biglarbegian_Behzad.pdf>, (Jan. 1, 2012), 169 pgs.

"Japanese Application Serial No. 2022-520564, Response filed Oct. 30, 2024 to Notification of Reasons for Refusal mailed Jul. 30, 2024", w English claims, 10 pgs.

\* cited by examiner

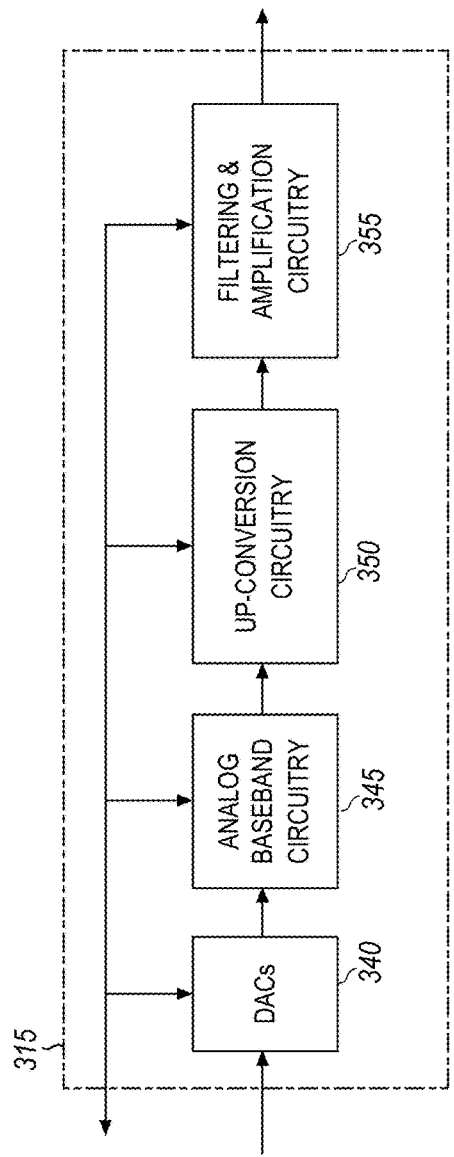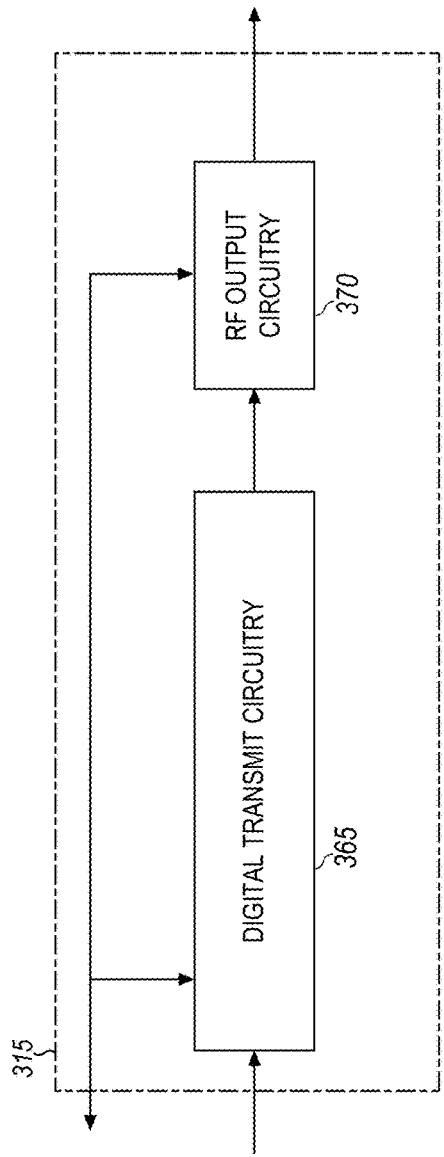

BEAM MANAGEMENT AND ANTENNA CALIBRATION IN MIMO SYSTEMS

This application is a division of U.S. patent application Ser. No. 17/761,940, filed Mar. 18, 2022, which is a U.S. National Stage Filing under 35 U.S.C. 371 from International Application No. PCT/US2019/068730, filed Dec. 27, 2019 and published in English as WO 2021/133412 on Jul. 1, 2021, each of which is incorporated herein by reference in its entirety.

TECHNICAL FIELD

Some aspects of the present disclosure pertain to wireless communication devices (e.g., mobile devices and base stations) that use antennas and antenna structures for communication of wireless signals. Some aspects of the present disclosure relate to devices that operate in accordance with 5th Generation (5G) wireless systems. Some aspects of the present disclosure relate to devices that operate in accordance with the Wireless Gigabit Alliance (WiGig) (e.g., IEEE 802.11ad) protocols or other 802.x protocols. Some aspects of the present disclosure relate to antenna array calibration in multiple-input multiple-output (MIMO) systems. Some aspects of the present disclosure relate to semi open-loop spatial multiplexing schemes based on orbital angular momentum (OAM) for line-of-sight (LoS) MIMO communications. Some aspects of the present disclosure relate to transmission mode switching for OAM and MIMO systems.

BACKGROUND

Various radio communication technologies use beamforming to improve transmit and/or receive gain. Beam calibration is one method by which gain can be improved. However, calibration errors can be introduced through non-linearities, heating, and noise in a system.

Furthermore, as the demand for connectivity increases and the available radio spectrum becomes crowded, antenna arrays are being used to realize multiple-input multiple-output (MIMO) communication systems, which enables obtaining more degrees of freedom via spatial multiplexing and helps operators to meet a growing need for spectral efficiency. However, in order to obtain maximal multiplexing gain in these systems, the system transmitter and receiver must have knowledge of channel conditions. This may be hard to achieve when there are multiple antennas and strict latency constraints, since obtaining this knowledge requires large training overheads, large feedback overhead, and/or low quality of channel estimation per antenna element.

Additionally, traditional wireless networks use a variety of beamforming and spatial multiplexing techniques to maximize channel capacity between transmitter and receiver. In short-range wireless media transfer usage scenarios (less than 6 ft transmission distance), WiGig (at 60 GHz), for example, uses beamforming to maximize total throughput by maximizing the spatial gain of the signal from transmitter to receiver. Orbital angular momentum (OAM) is a spatial multiplexing scheme that can be used to multiply total channel capacity by transmitting and detecting mutually orthogonal OAM modes along the same propagation axis and physical channel. Some physical channel conditions are well-suited to OAM, but other conditions would be better suited to beamforming or other propagation schemes to achieve higher total channel capacity.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 3B illustrates aspects of exemplary transmit circuitry illustrated in FIG. 3A according to some aspects.

FIG. 3C illustrates aspects of exemplary transmit circuitry illustrated in FIG. 3A according to some aspects.

DETAILED DESCRIPTION

Figure 1:
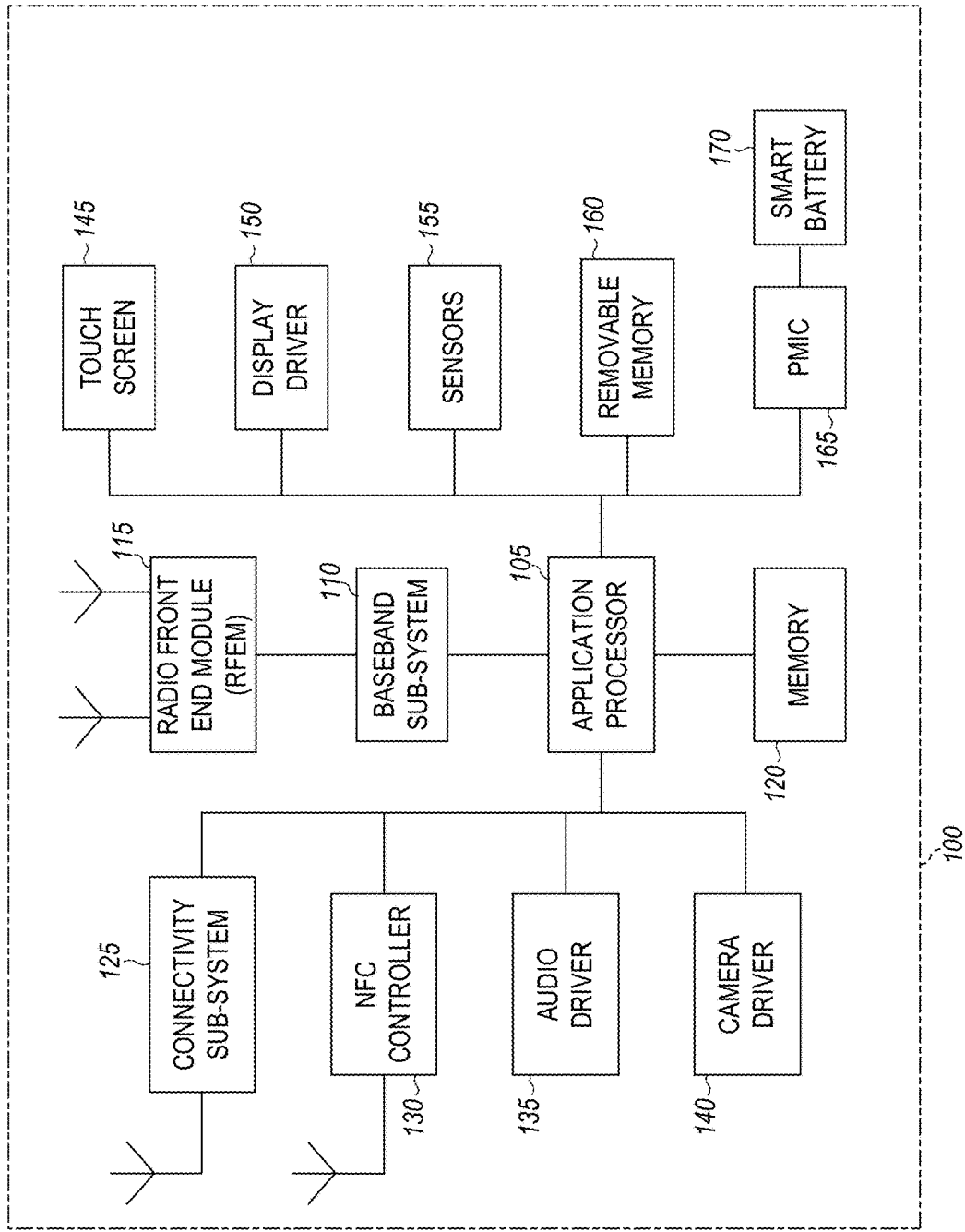
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real-time clock (RTC), timer-counters including interval and watchdog timers, general-purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
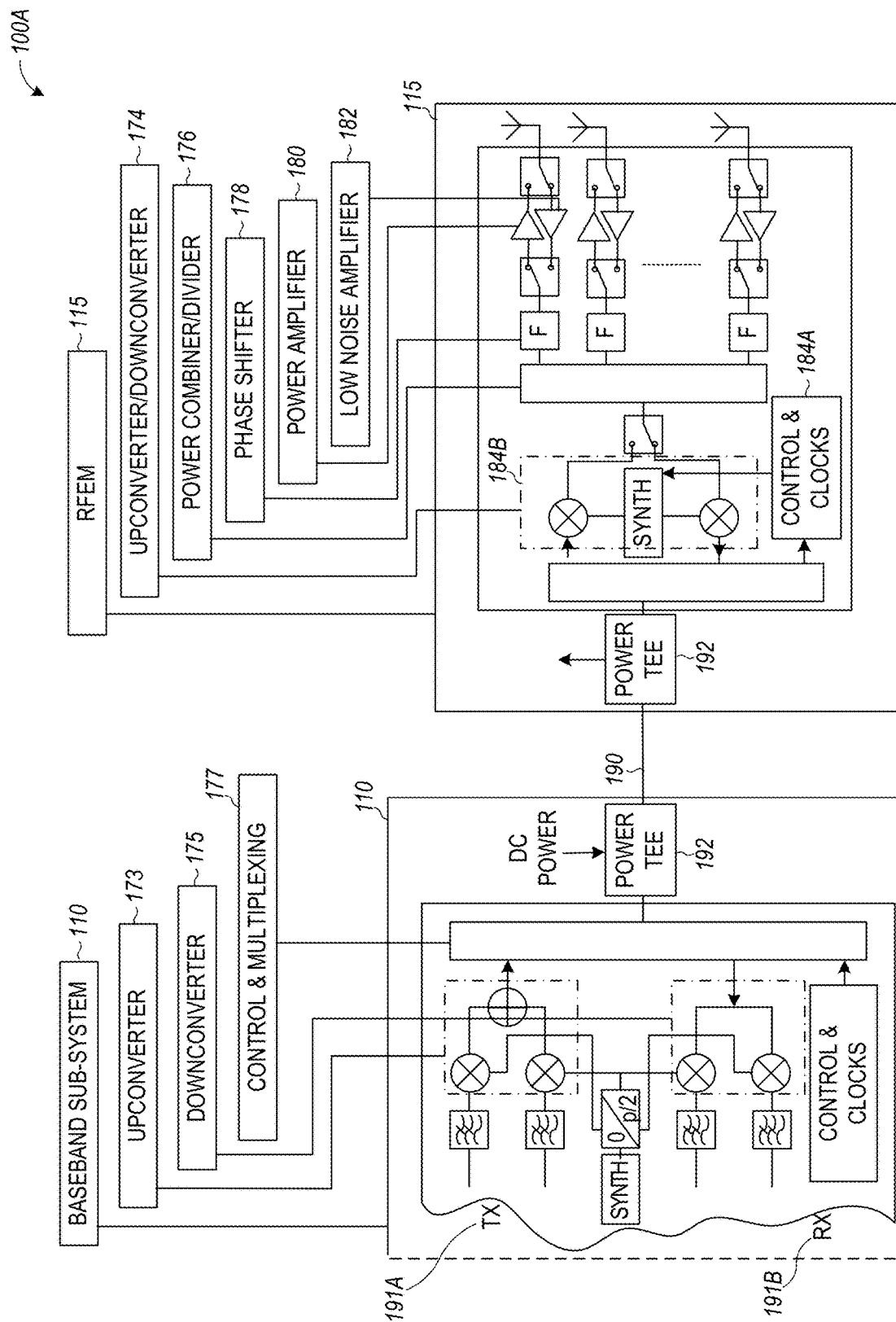
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of an analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter-wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter-wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
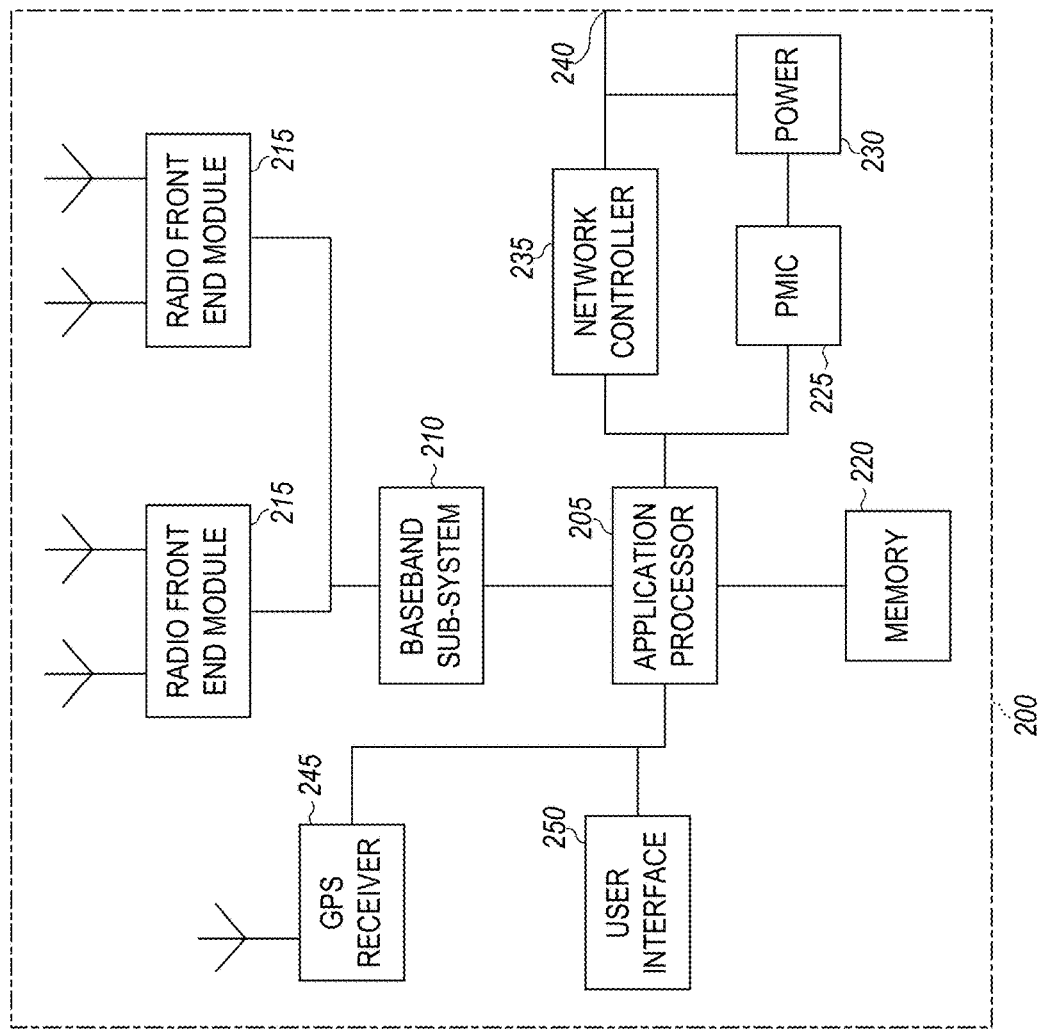
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real-time clock (RTC), timer-counters including interval and watchdog timers, general-purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional cross-point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brownout (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
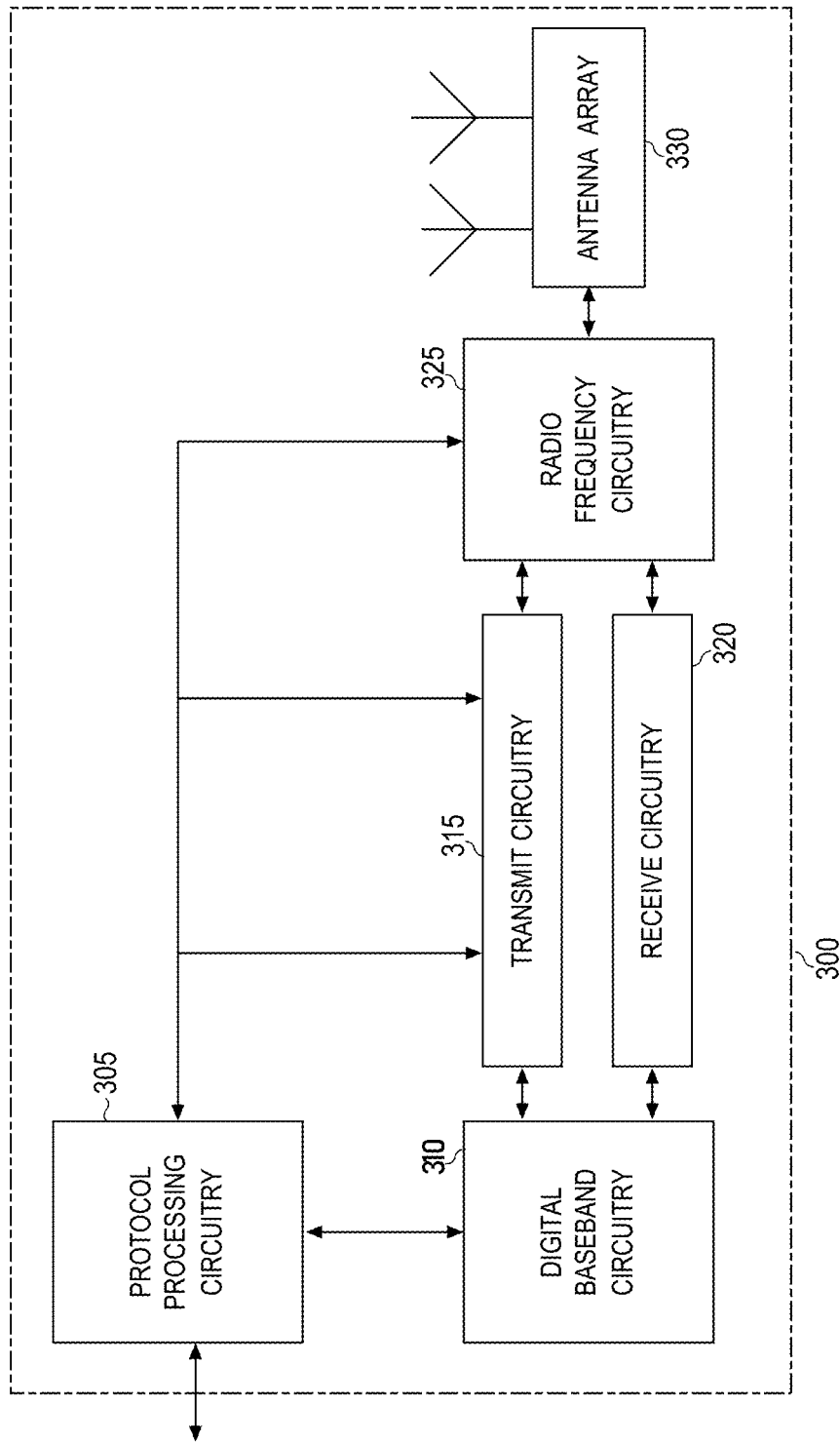
FIG. 3A illustrates exemplary millimeter-wave communication circuitry according to some aspects.
Figure 3D:
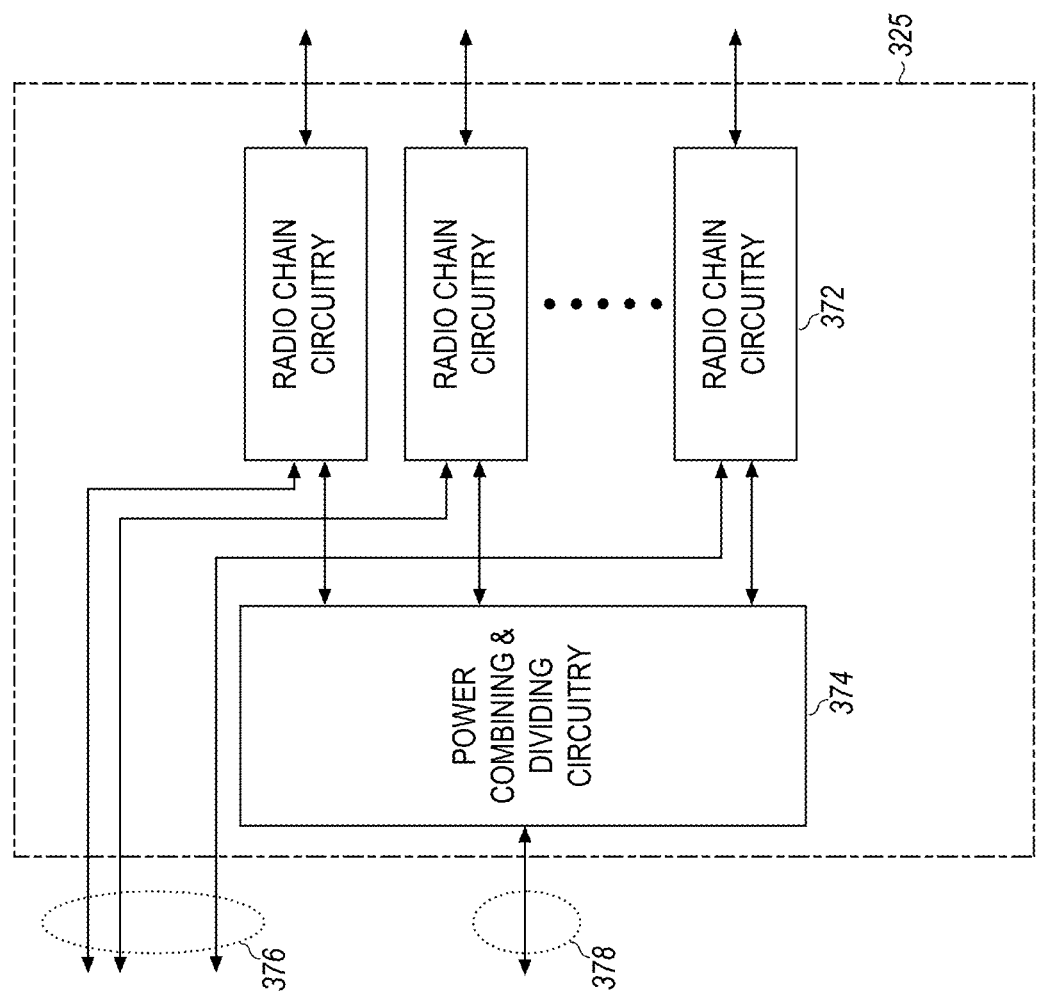
FIG. 3D illustrates aspects of exemplary radio frequency circuitry illustrated in FIG. 3A according to some aspects.
Figure 3E:
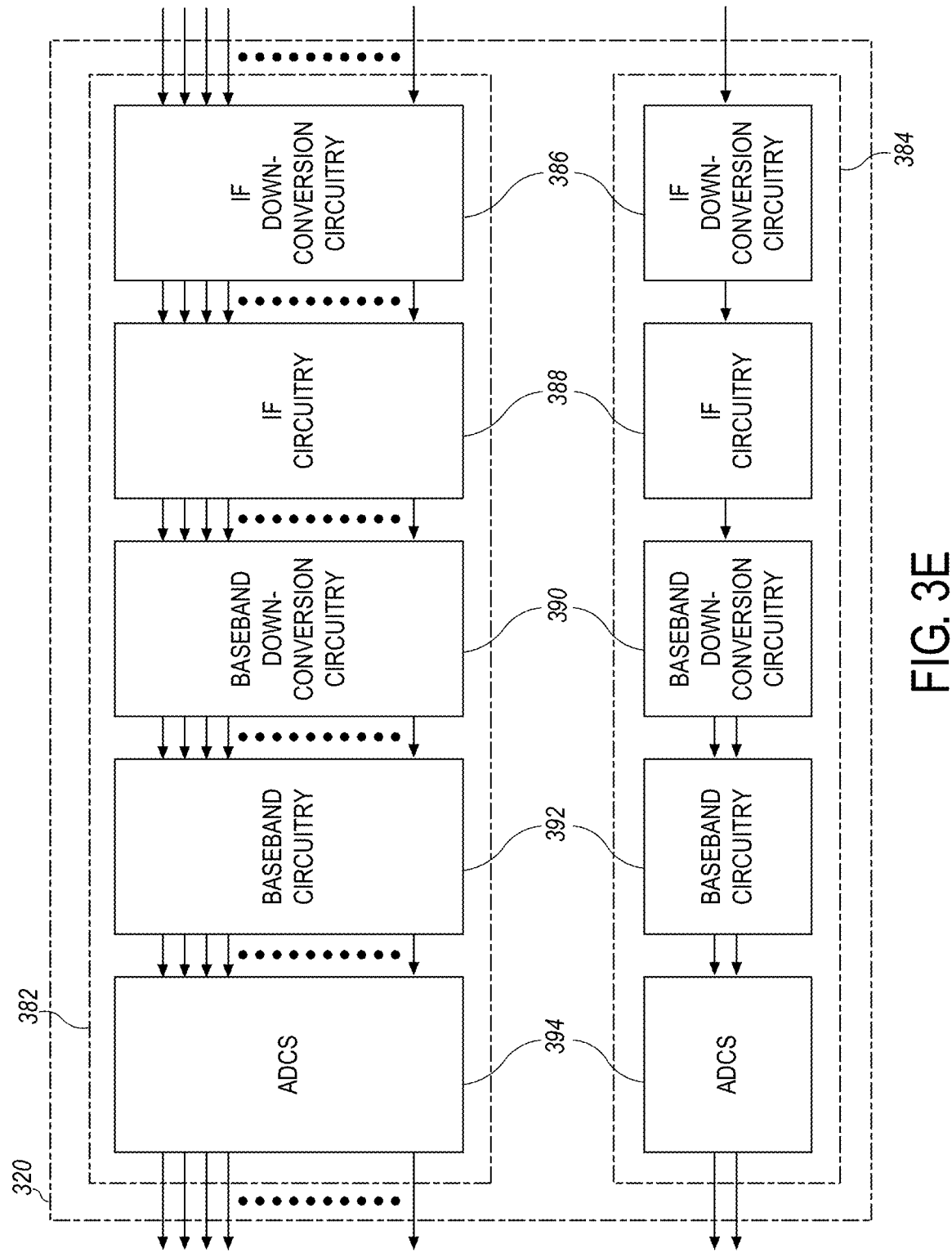
FIG. 3E illustrates aspects of exemplary receive circuitry in FIG. 3A according to some aspects.

FIG. 3A illustrates exemplary mm Wave communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Millimeter-wave communication circuitry 300 shown in FIG. 3A may be alternatively grouped according to functions. Components illustrated in FIG. 3A are provided here for illustrative purposes and may include other components not shown in FIG. 3A.

Millimeter-wave communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter-wave communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter-wave communication circuitry 300 may further include transmit circuitry 315, receive circuitry 320 and/or antenna array circuitry 330. Millimeter-wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters, and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
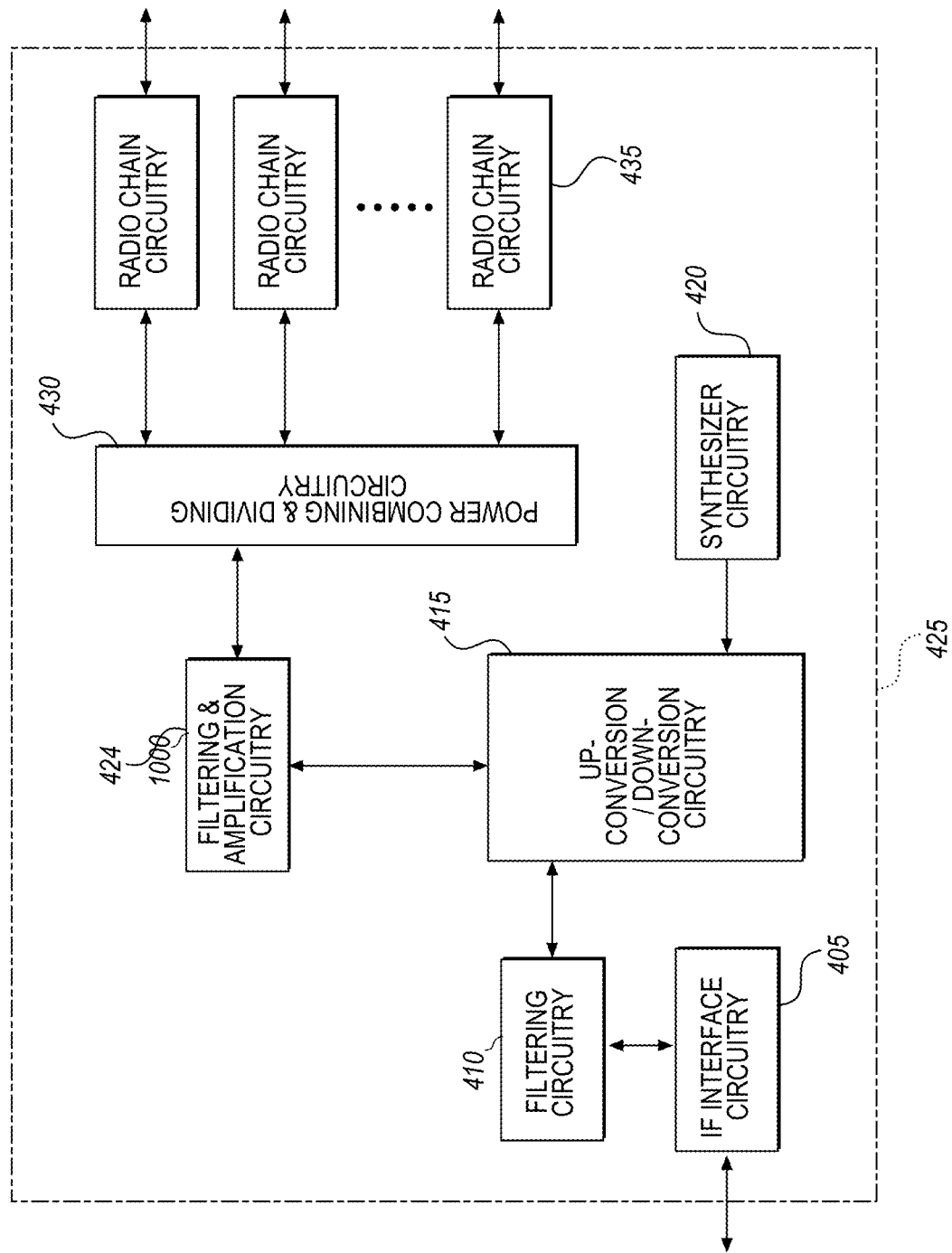
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5B:
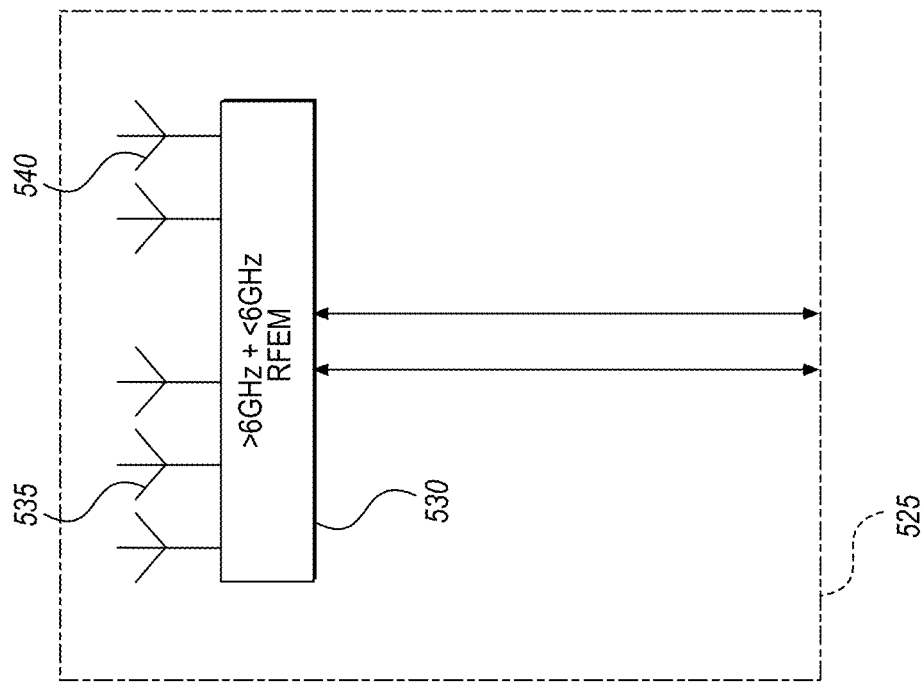
FIG. 5B illustrates an alternate aspect of an exemplary radio front end module, according to some aspects.
Figure 5A:
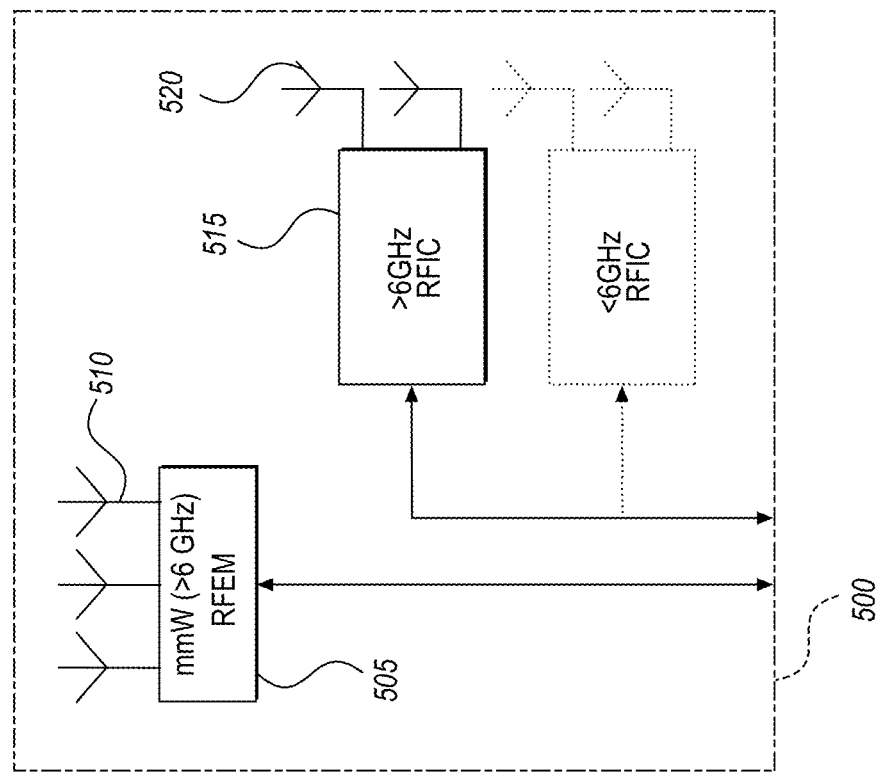
FIG. 5A illustrates an aspect of an exemplary radio front end module (RFEM) according to some aspects.

FIG. 5A and FIG. 5B illustrate aspects of a radio front end module useable in the circuitry shown in FIG. 1 and FIG. 2, according to some aspects. FIG. 5A illustrates an aspect of a radio front end module (RFEM) according to some aspects. RFEM 500 incorporates a millimeter-wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter-wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter-wave and sub-six gigahertz radio functions may be implemented in the same physical radio front end module (RFEM) 530. RFEM 530 may incorporate both millimeter-wave antennas 535 and sub-six gigahertz antennas 540.

Figure 6:
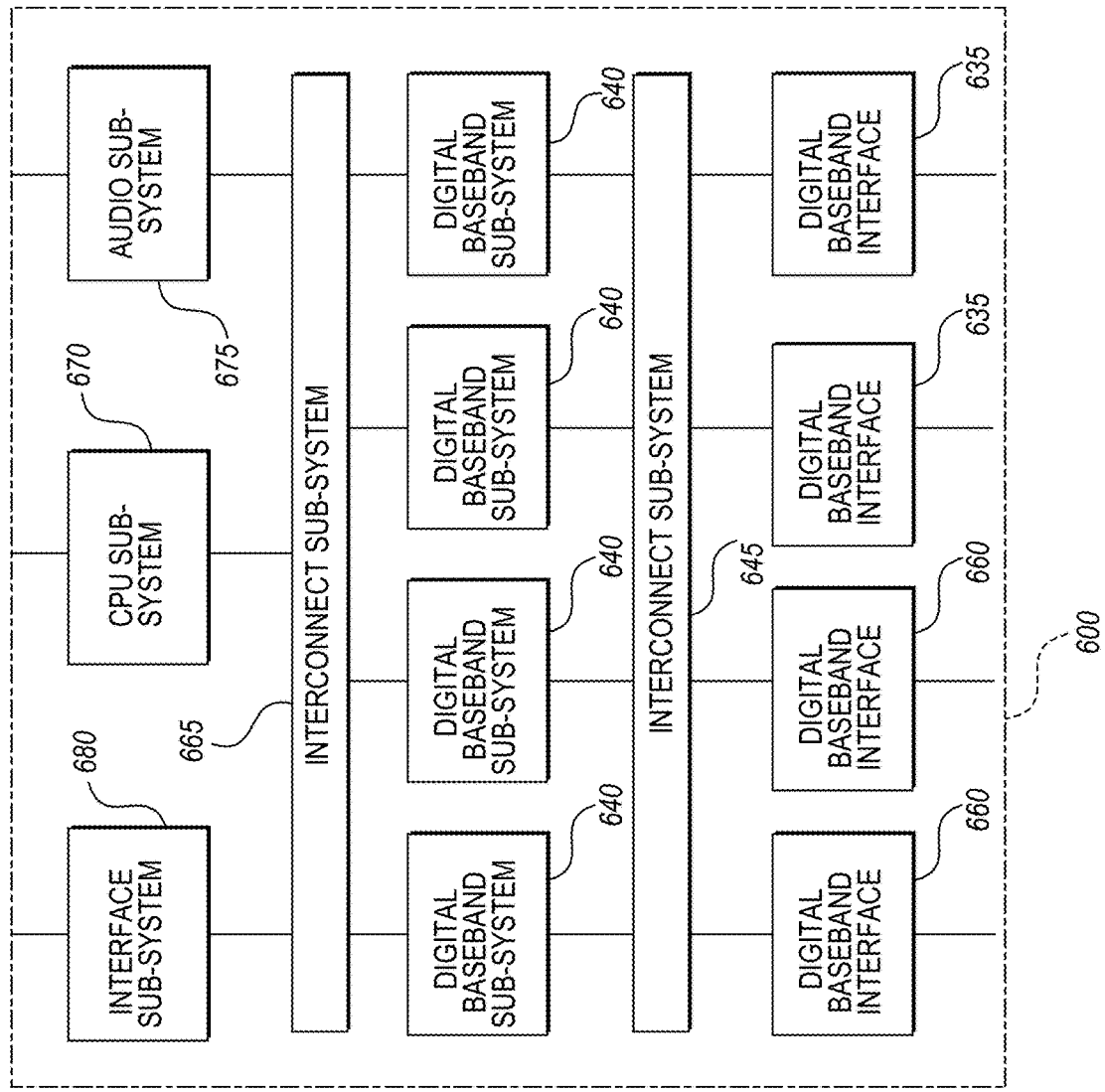
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, the baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
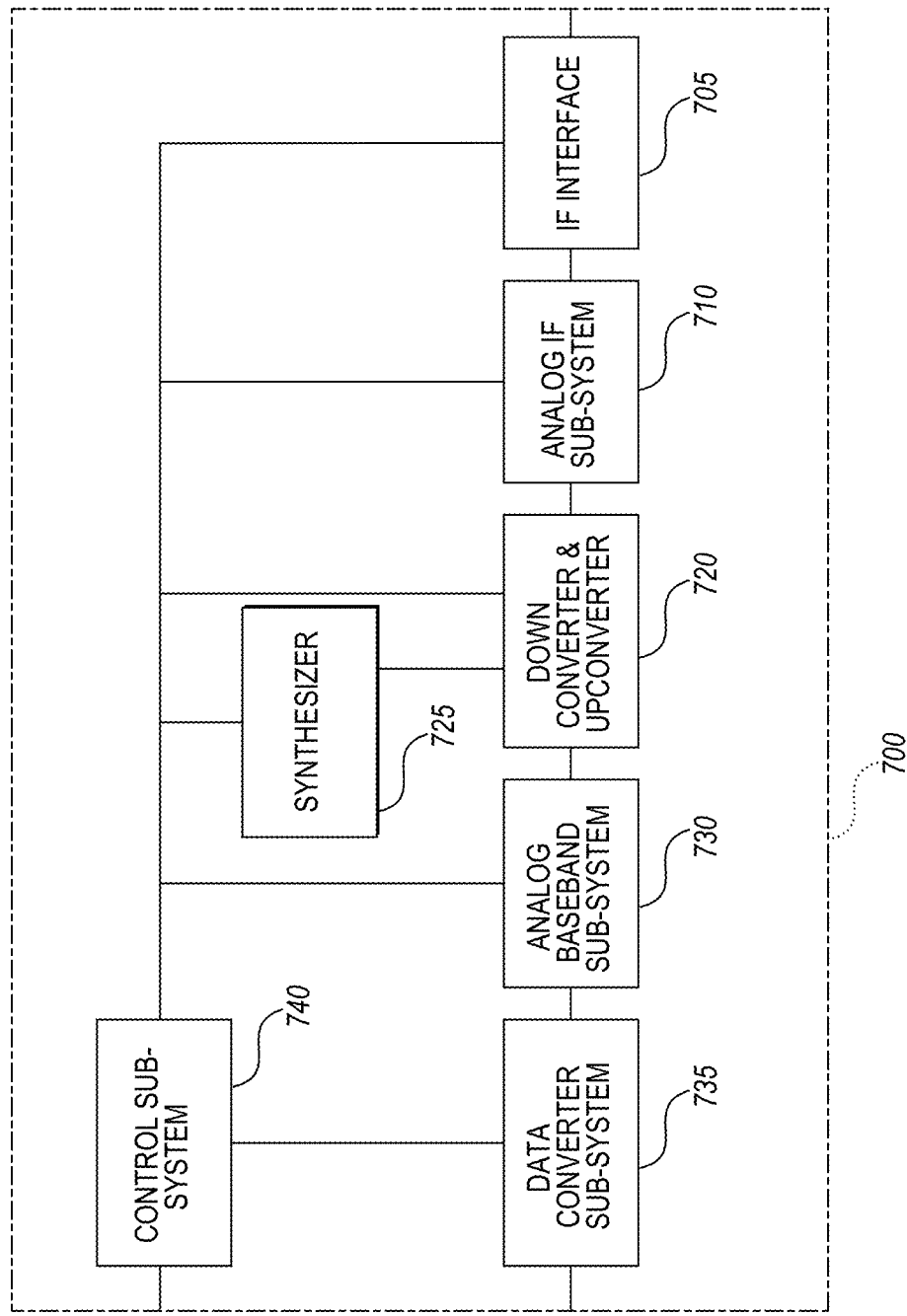
FIG. 7 illustrates an exemplary mixed-signal baseband subsystem, according to some aspects.

FIG. 7 illustrates an exemplary of a mixed-signal baseband subsystem 700, according to some aspects. In an aspect, mixed-signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
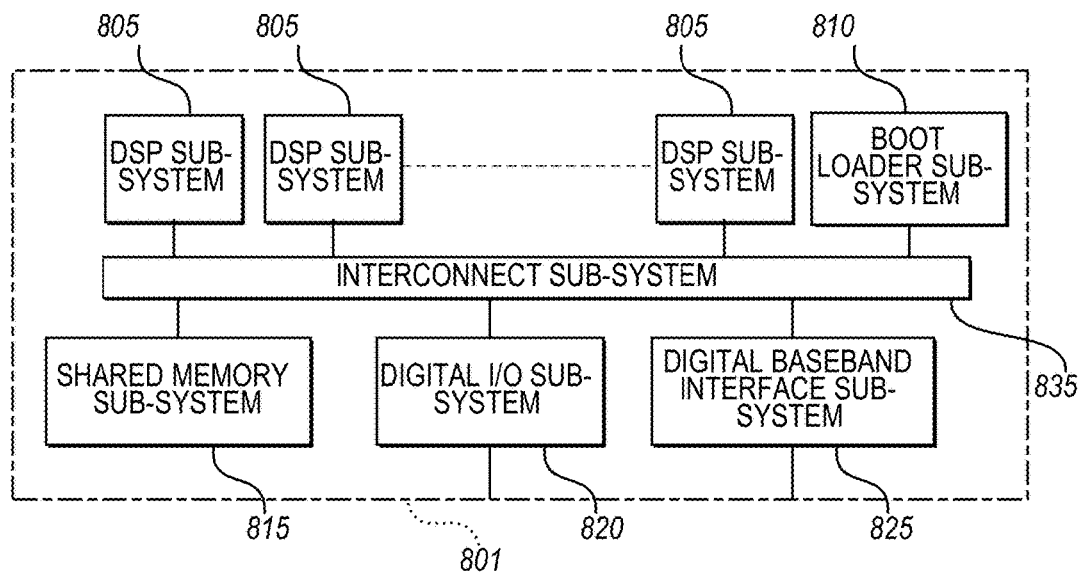
FIG. 8A illustrates an exemplary digital baseband subsystem, according to some aspects.
Figure 8B:
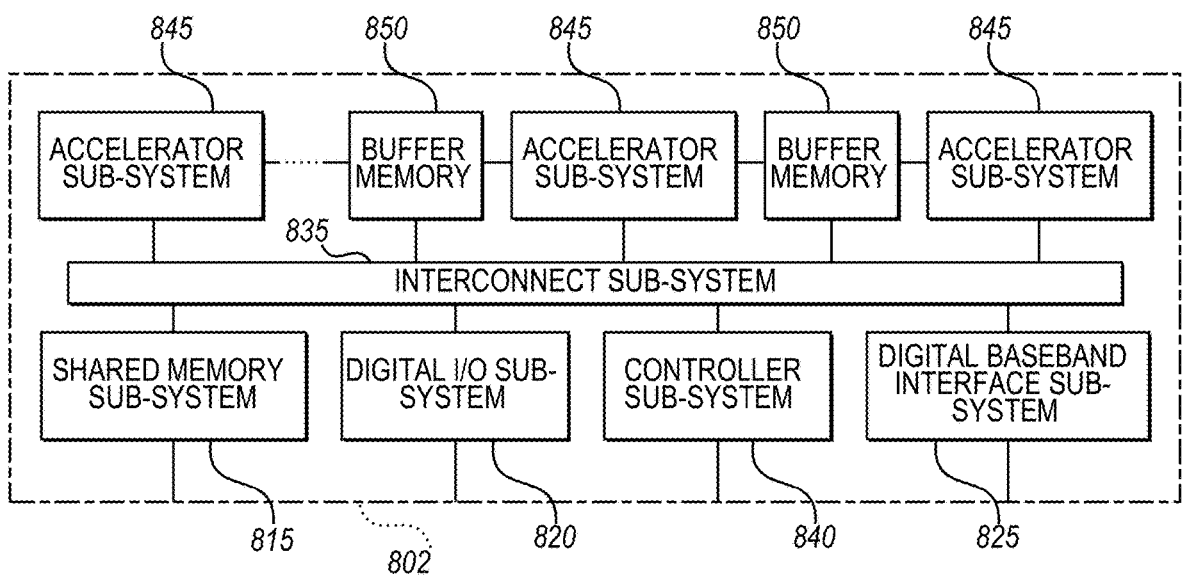
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between the baseband processing subsystem and mixed-signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
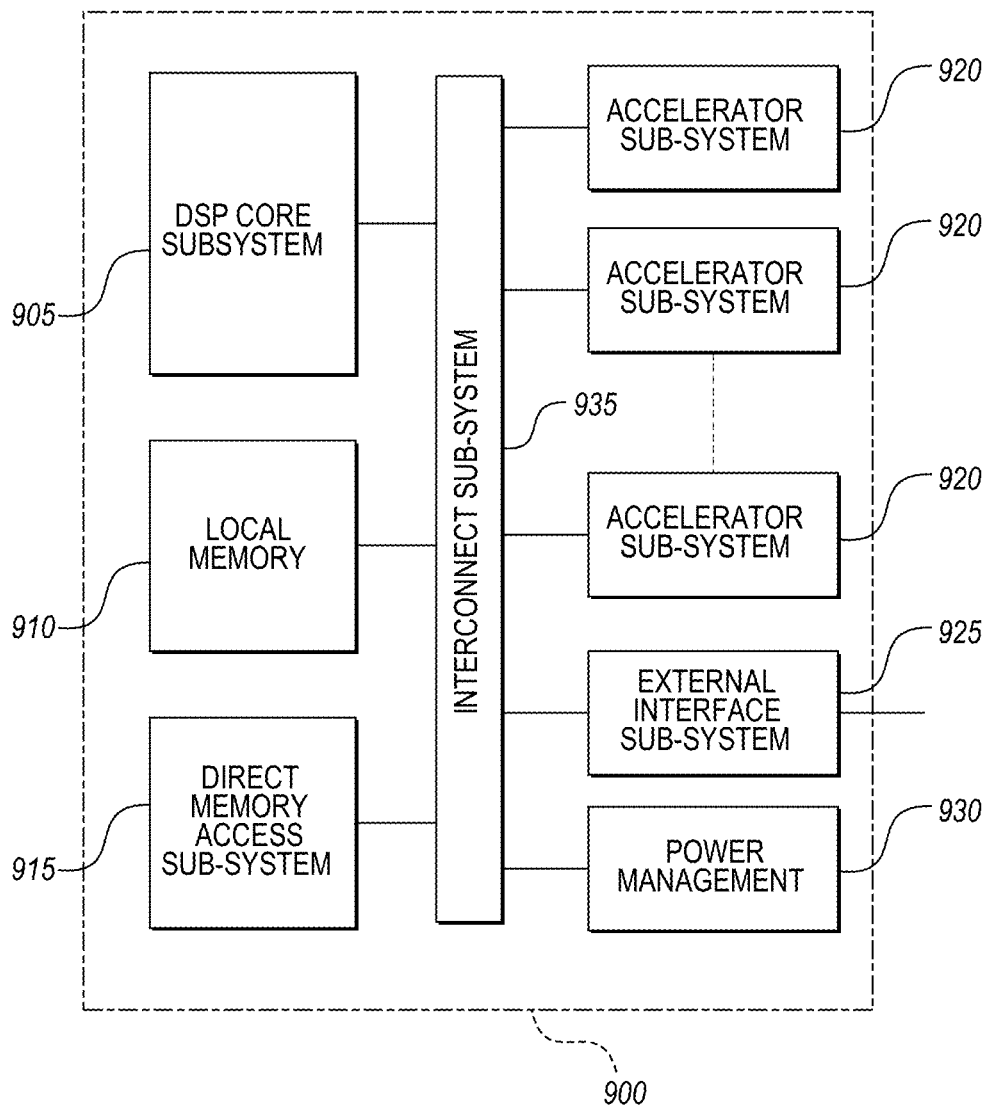
FIG. 9 illustrates an exemplary digital signal processor subsystem, according to some aspects.

FIG. 9 illustrates a digital signal processor (DSP) subsystem 900 according to some aspects.

In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, the external interface subsystem 925 may provide for access by a microprocessor system external to DSP subsystem 900 to one or more of memory, control registers and status registers which may be implemented in DSP subsystem 900. In an aspect, the external interface subsystem 925 may provide for transfer of data between local memory 910 and storage external to DSP subsystem 900 under the control of one or more of the DMA subsystem 915 and the DSP core subsystem 905.

Figure 10A:
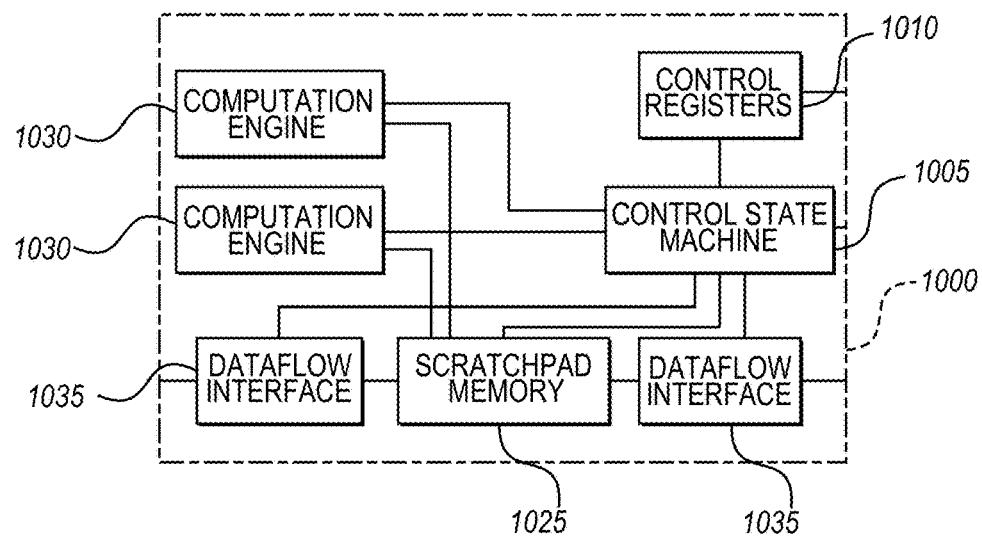
FIG. 10A illustrates an example of an accelerator subsystem, according to some aspects.
Figure 10B:
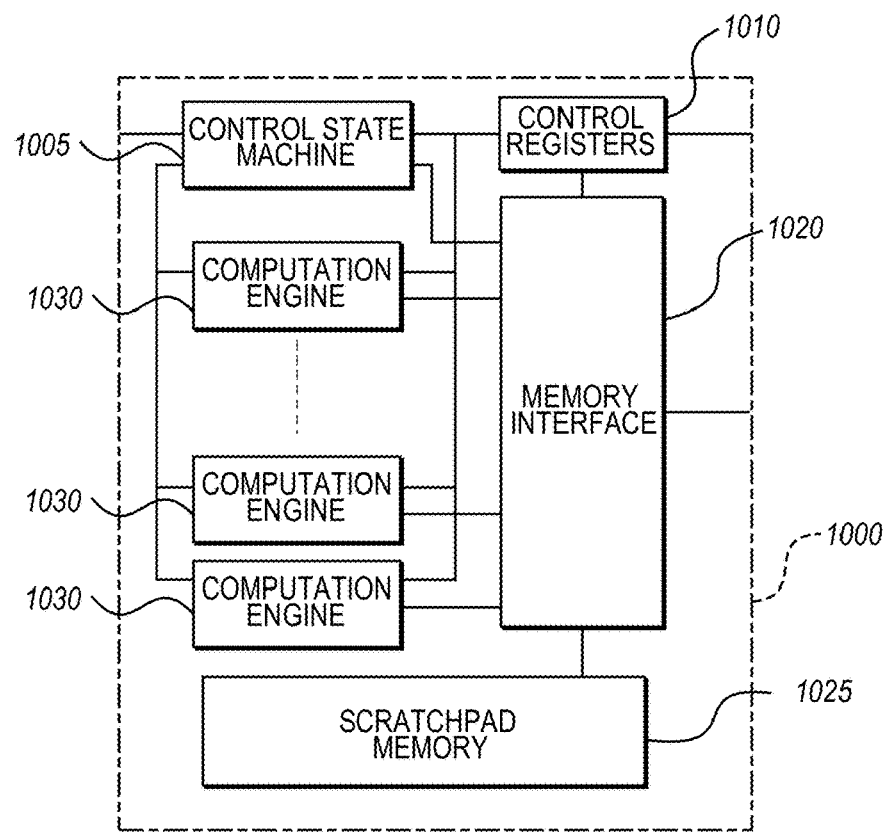
FIG. 10B illustrates an alternate exemplary accelerator subsystem, according to some aspects.

FIG. 10A illustrates an example of an accelerator subsystem 1000 according to some aspects. FIG. 10B illustrates an example of an accelerator subsystem 1000 according to some aspects.

In an aspect, accelerator subsystem 1000 may include one or more of each of control state machine 1005, control registers 1010, memory interface 1020, scratchpad memory 1025, computation engine 1030A . . . 1030N and dataflow interface 1035A, 1035B.

In an aspect, control registers 1010 may configure and control the operation of accelerator subsystem 1000, which may include one or more of: enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000.

A Method of Antenna Array Calibration for MIMO Receivers

Wireless chip-to-chip communications can include multiple antenna systems at the receiver. The aggregate data rate requirement can be very large for such communications, and high frequencies (e.g., terahertz-band) are often used for such communications. However, multiple-antenna systems may have calibration errors due to heating or non-linearity and noise in the system. The resulting calibration error will impact the beamforming performance which will in turn contribute to increased interference, degradation in signal-to-noise ratio (SNR), and reduced data rate.

Some methods for calibrating multiple-antenna systems utilize pre-calibrated beamforming vectors. However, due to thermal heating or changes in antenna electrical properties, pre-calibrated codebook values may not be valid, leading to increased interference.

Some other methods for calibrating multiple-antenna systems can include closed-loop beam tracking methods, which blindly adapt beam directions according to a spatial correlation of received signal to maximize received signal power. However, closed-loop beam tracking can result in a beam forming vector with a very high side lobe that captures power from the interference and creates significant loss at block error rate. Losses can increase depending on interference direction and strength. Furthermore, multi-beam tracking methods can be overly-complex.

Methods, systems and apparatuses according to some aspects provide low-complexity blind, digital beam calibration for multi-antenna systems that may otherwise exhibit the above-described calibration errors. Methods according to some aspects can maximize beamforming gain by mitigating antenna array phase errors as will be described herein. Blind beam calibration can improve latency in communications because no pilot sequence is used for calibration and calibration can be done based on any communication signals in a channel. In contrast, other types of calibration require periodic transmission of a pilot sequence. In addition, digital beamforming has the advantage of allowing for beam calibration in the digital domain parallel to the data path. Methods according to aspects can be executed in a fully digital receiver as depicted in FIG. 11.

Figure 11:
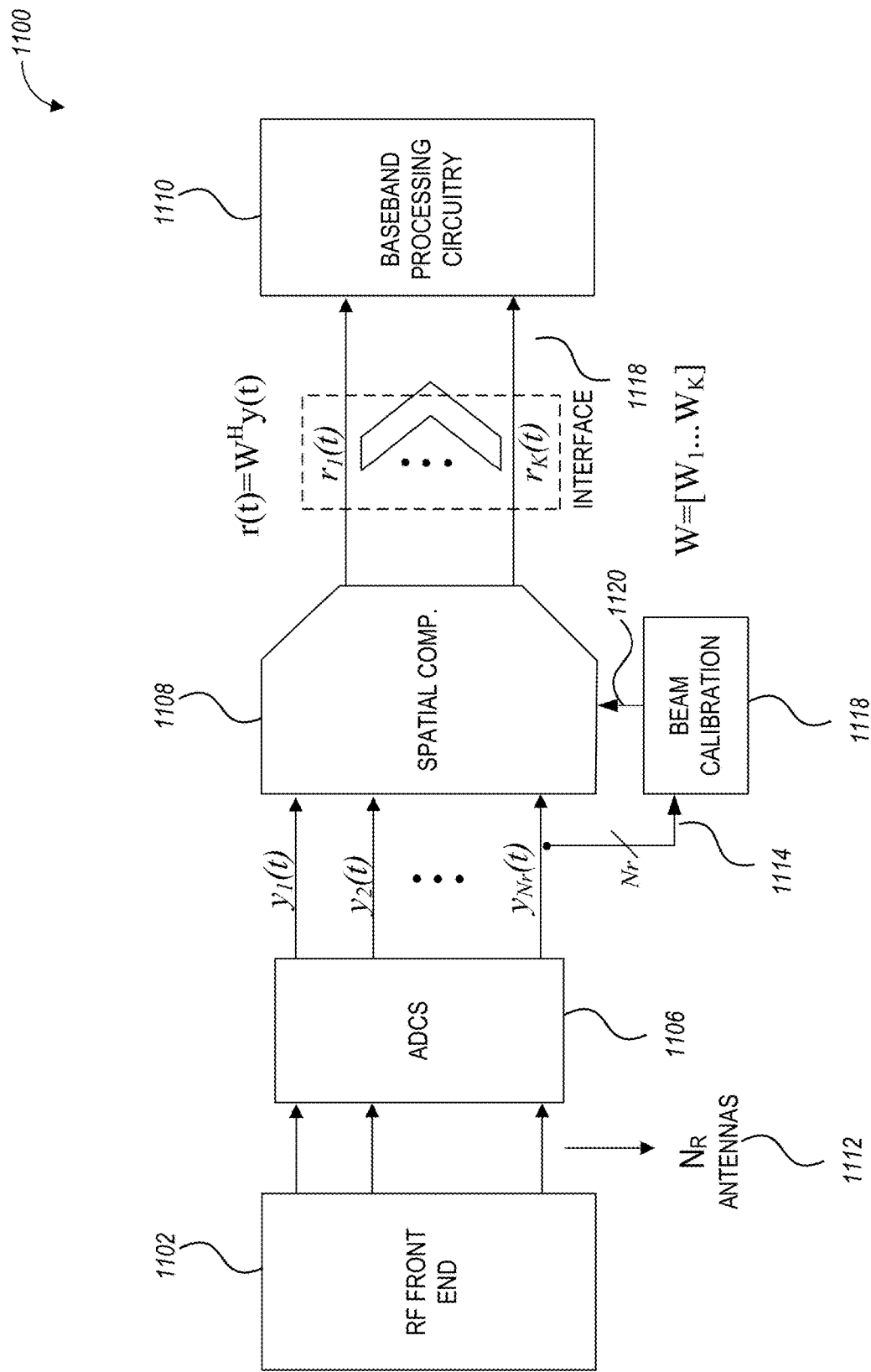
FIG. 11 illustrates an exemplary fully digital mmWave receiver architecture in accordance with some aspects.

FIG. 11 illustrates an exemplary fully digital mmWave receiver architecture 1100 in accordance with some aspects. Compression is conducted over the space domain, wherein $N_r$ antennas 1112 are fed through ADCs 1106 to provide $N_r$ complex signals y 1114. Blind beam calibration is performed by beam calibration circuitry 1118 using inputs 1114 and providing beamforming vectors 1120 to compression circuitry 1108, which in turn provides beamformed outputs 1116 to the baseband processing circuitry 1110.

Optimization metrics for beam calibration can include maximization of received signal power in some aspects, by maximizing over a calibration vector (see Equation (1) below). For a given number of I/O interface links M, methods according to aspects track M beams which provide the most receive power in time-domain.

$$\arg\max_{c} E\{D\text{diag}(c)y\} \qquad (1)$$

where D is beamforming directions and c is calibration error, y is the received signal (wherein no training is required), and diag(c) is the diagonalization of the calibration vector.

The cost function maximizes the received signal power after beamforming. Methods according to proposed aspects use time-domain samples without requirements for time and frequency offset correction. This blind approach works in both the frequency and time domain. To reduce the high side lobes described above, constraints are imposed on closed-loop beam tracking methods according to aspects described herein.

A signal received at a k-th antenna is given according to Equation (2):

$$y_k(t) = h_k x(t) + n(t) \quad (2)$$

In vector form this can be written as $$y(t) = hx(t) + n(t) \quad (3)$$

where x(t) is the transmitted signal, h is the channel and n(t) is a noise signal.

h can be expressed as:

$$h = \sum_c \sum_m g_{cm} a(\theta_{cm}) \quad (4)$$

where the angle of arrival $a(\theta) = \begin{bmatrix} 1 & e^{j\pi \sin\theta} & \ldots & e^{j(K-1)\pi \sin\theta} \end{bmatrix} \quad (5)$ and $g_{cm}$ is the complex gain of the m^th element in the c^th cluster.

Figure 12:
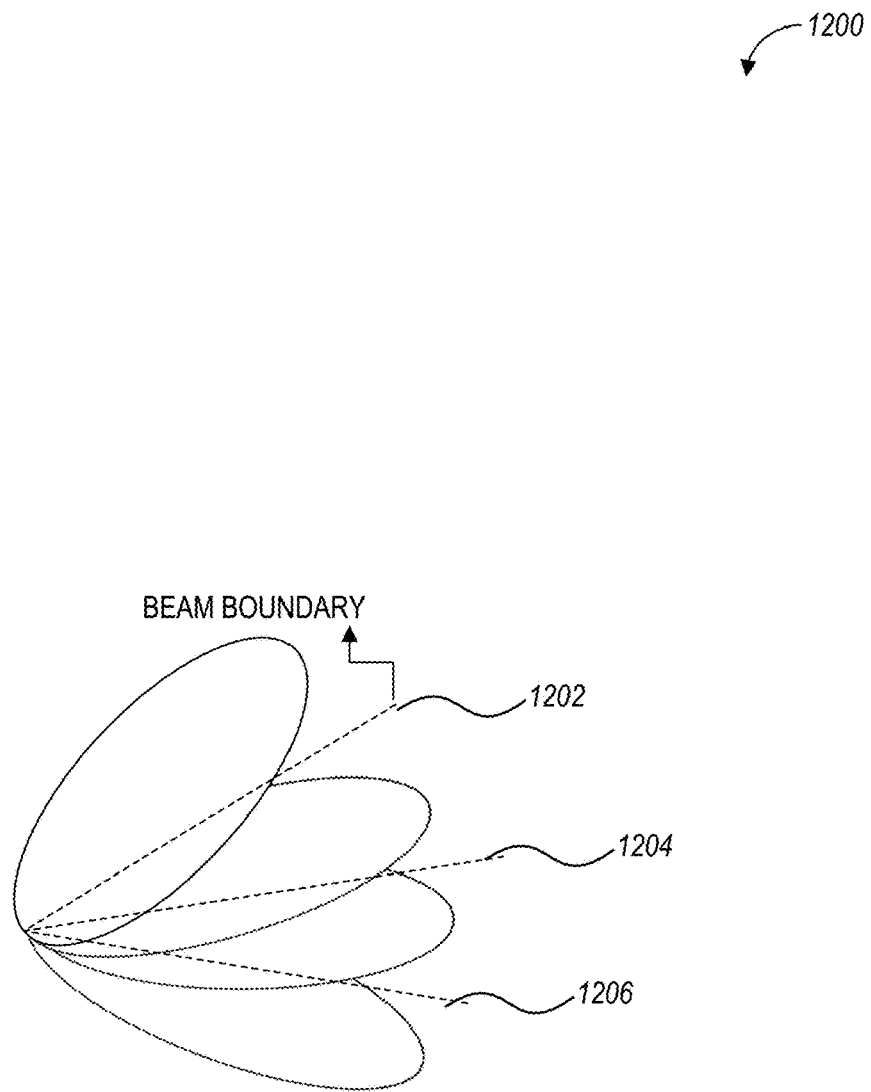
FIG. 12 illustrates beam boundaries for closed-loop beam tracking in accordance with some aspects.

Given beamforming matrix D, the best beam direction $d_{best}$ in terms of received signal power (highest beamforming gain) can be selected from D. The phase values of the best beam are denoted:

$$\theta^o = [\theta_1^o, \theta_2^o, \ldots, \theta_N^o] = L d_{best} \quad (6)$$

for a uniform linear array with N antennas. To avoid diverging to the direction of interference, phase constraints are set according to some aspects such that after running closed-loop beam tracking, methods do not steer beams towards other beam directions (which can contribute to interference). Accordingly, phase constraints are defined:

$$\theta_{range}^+ < [\theta_1^o, \theta_2^o, \ldots, \theta_N^o] + \quad (7)$$
$$\left(\max\left\{\left|\left\lfloor\frac{N}{2}\right\rfloor - 1, \left\lfloor\frac{N}{2}\right\rfloor - 2, \ldots, 0, 0, \ldots, \left\lfloor\frac{N}{2}\right\rfloor - 2, \left\lfloor\frac{N}{2}\right\rfloor - 1\right|, v\right\}\right)e$$

$$\theta_{range}^- \geq [\theta_1^o, \theta_2^o, \ldots, \theta_N^o] - \quad (8)$$
$$\left(\max\left\{\left|\left\lfloor\frac{N}{2}\right\rfloor - 1, \left\lfloor\frac{N}{2}\right\rfloor - 2, \ldots, 0, 0, \ldots, \left\lfloor\frac{N}{2}\right\rfloor - 2, \left\lfloor\frac{N}{2}\right\rfloor - 1\right|, v\right\}\right)e$$

for a linear array with N antennas, $\theta_{range}^-$ is lower bound, and $\theta_{range}^+$ is the upper bound. Given the number of antennas in the antenna array is N, (N/2−1, . . . ,0)e represents phase offset of left side of antenna array with respect to the center element. (0, . . . ,N/2−1)e represents phase offset of right side of antenna array. Note that linear increase in antenna elements is due to the uniform linear arrangement of antenna elements. Note that max{.,v} comes from the limit on calibration error. Without max{.,v}, the center two antenna elements have a calibration error limit equal to zero. This means these antennas cannot have calibration error. In order to adjust for that, max{.,v} is added so that the center two antenna elements have (−v,v) calibration error. The calibration error per antenna can be expressed [−e,e], which limits divergence to other beam directions, and v is the upper bound on the maximum relative phase error due to thermal heating. The phase constraints are shown as beam boundaries 1202, 1204, and 1206 in FIG. 12.

The close-loop beam tracking algorithm is executed as follows:

$$z_k(t) = w_k^* y_k(t) = w_k^* h_k x(t) + w_k^* n(t) \quad (9)$$

The weights $w_k^*$ are determined by the algorithm that maximizes the output power of the beamformed signal r(t):

$$r(t) = \sum_k z_k(t) = \sum_k w_k^* y_k(t) \quad (10)$$

An example of such an algorithm is using an Equal Gain Combining technique that maximizes the output power $$w_k = e^{j\theta_k} \quad (11)$$

Where phases are bound according to:

$$\theta_k = \min\{\max\{\theta_k - \mu \text{Im}\{(t)z_k^*(t)\}, \theta_{range}^-\}, \theta_{range}^+\} \quad (12)$$

where μ is a convergence parameter.

As explained above, after running close-loop calibration, phase values converge to a value that maximizes received signal power. Inherently, this algorithm solves any phase calibration error at the receiver path. $\theta_k$ is updated at each sample time to find the best phase for each antenna.

After finding the calibrated beam forming vector w the difference between phases of calibrated beams and the original phases of the uncalibrated beams (e.g., the "calibration error") are computed to find c to be used in equation (1):

$$c = e^{j([\theta_1, \theta_2, \ldots, \theta_N] - [\theta_1^o, \theta_2^o, \ldots, \theta_N^o])} \quad (13)$$

The closed-loop algorithm described above maximizes beamforming gain by adjusting each antenna element phase. The same calibration error computed in Equation (13) is used to calibrate the entire codebook (e.g., for each beam) because the calibration error is common for all beam directions. Stated another way, because each beam direction uses the same antenna array, each beam direction should have the same calibration error because the antennas of an antenna array are all subjected to the same heat, noise, and other conditions. Furthermore, if each beam were calibrated differently, orthogonality would be lost and interference would increase.

Figure 13:
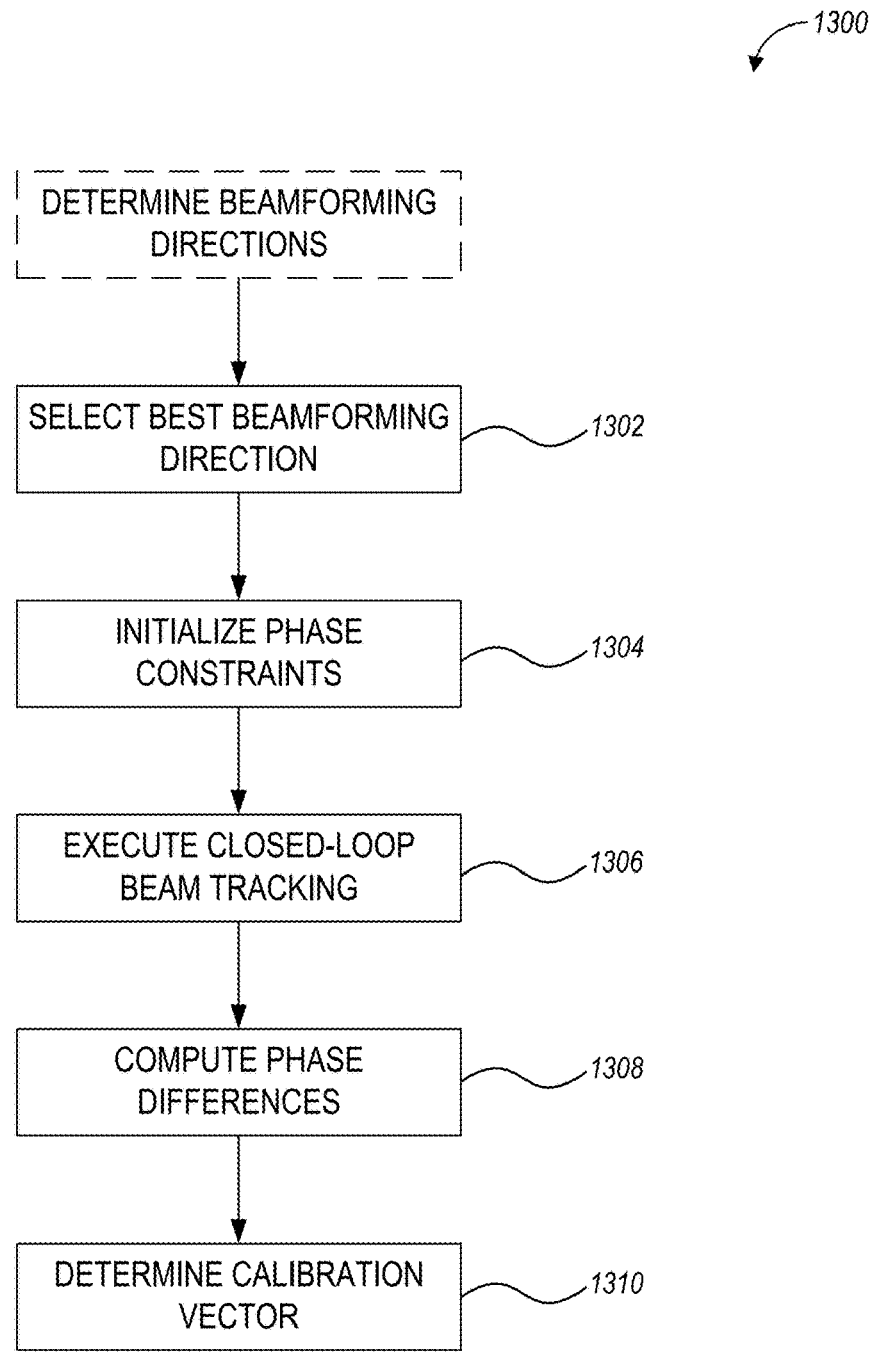
FIG. 13 illustrates a method for antenna array calibration according to some aspects.

FIG. 13 illustrates a method 1300 for antenna array calibration according to some aspects. Some operations of method 1300 can be performed by processing circuitry such as compression circuitry 1108 (FIG. 11), or baseband processor 110 (FIG. 1). The method 1302 can begin with processing circuitry determining which best beam direction, of a matrix of beamforming directions is best, wherein a "best" beam direction is the beam direction at which received power is maximized. In some aspects, the best beam direction can be determined based on Equations (2)-(6), as described earlier herein. In some aspects, beamforming directions can be determined periodically, or upon noticing a degradation in communication.

The example method 1300 continues with operation 1304 with the processing circuitry initializing phase constraints. In some aspects, phase constraints can be defined as describe above with reference to Equations (7)-(8), as described earlier herein. The example method 1300 continues with operation 1306 with the processing circuitry executing closed-loop beam tracking of received signals according to, for example, Equations (9)-(12) as described earlier herein.

The example method 1300 continues with operations 1308 and 1310 with the processing circuitry determining differences between the phases of the calibrated beams and original phases of the uncalibrated beams to determined calibration error according to Equation (13) described earlier herein to determine calibration error. Once the calibration errors are determined, codebooks can be adjusted for subsequent communications, based on the calibration error. As described earlier herein, the same calibration error computed is used to calibrate the entire codebook to limit interference between beams.

Semi Open-Loop Spatial Multiplexing Scheme Based on Orbital Angular Momentum (OAM) for Line-of-Sight (LoS) MIMO Communication Antenna arrays can be used to realize MIMO communication systems, which enables obtaining more degrees of freedom via spatial multiplexing and helps operators to meet a growing need for spectral efficiency. In long-range line-of-sight (LoS) communications, the channel matrix is of rank 1. For long-range LoS, beamforming for a single data stream can be applied to provide coverage.

For short-range LoS (chip-to-chip communications is one example of short-range communication, although aspects are not limited thereto), the channel matrix has high rank (wherein the actual rank depends on the specific distance and the number of antenna elements), and higher multiplexing gains can be achieved. The maximum distance at which this multiplexing gain can be achieved is determined by the size of the transmitter and receiver apertures, and the wavelength. For high frequency applications, such as terahertz communications, this "short" distance becomes applicable in practice.

In order to achieve the maximal multiplexing gain from the channel, the transmitter and receiver circuitry in current systems obtain detailed knowledge of the channel matrix (CSI). Obtaining such knowledge may be difficult when there are multiple antennas and strict latency constraints, since it requires large training overheads, large feedback overhead, and/or low quality of channel estimation per antenna element. Apparatuses, systems and methods according to some aspects provide a scheme which requires feedback only for simple sector sweeping prior to communication, rather than full knowledge of the channel itself. Blind power allocation is performed on pre-computed orthogonal streams for semi-open-loop MIMO multiplexing. In aspects, power may be allocated based on Orbital Angular Momentum (OAM) mode. Because the channel is LoS (e.g., there are no or few scatterers), multiplexing gain can be provided in a semi-open-loop fashion, based on the geometries of the transmitter and receiver arrays.

Methods according to aspects provide a multiplexing scheme for MIMO LoS systems. While this scheme is applicable for any communication range, it works best for short range, providing significant multiplexing gain over standard beamforming. MIMO beamforming according to aspects utilizes a fixed transmit-receive antenna array structure. Methods according to aspects do not estimate the channel per antenna, thereby reducing latency. Methods according to aspects optimize spatial multiplexing beamforming by selecting one or more of the beam directions using sector sweeping, which can increase SNR. In addition when a transmitter and receiver are not aligned, sector sweeping easily finds the beamforming.

Figure 14:
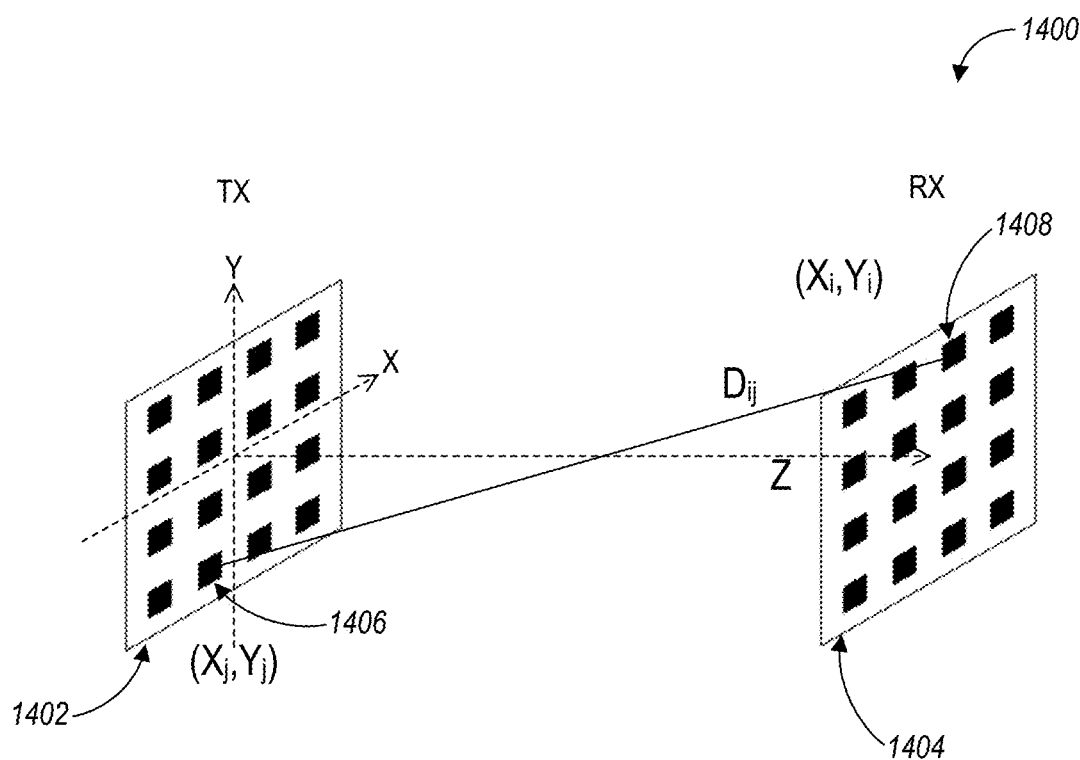
FIG. 14 illustrates a line-of-sight MIMO communication system according to some aspects.
Figure 15:
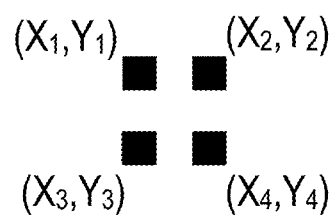
FIG. 15 illustrates a rectangular array of antenna elements according to some aspects.

FIG. 14 illustrates a line-of-sight MIMO communication system 1400 according to some aspects. The system 1400 includes a transmitter antenna array 1402 and a receiver antenna array 1404. Each array 1402, 1404 includes a number of antenna elements on a plane. The arrays 1402, 1404 are assumed omnidirectional with gain 0 dBi; however, aspects are not limited thereto and methods according to aspects can be extended to allow for arbitrary gains and directivity patterns of antennas). The transmitter antenna array 1402 has N antenna elements 1406 at locations $\{(x_i, y_i)\}_{i=1}^{N}$ on the plane, as illustrated in FIG. 15. For example, a uniform linear array has $(x_i, y_i) = (i\Delta, 0)$, $i=1, \ldots, N$, for some separation $\Delta$). Similarly, the receiver antenna array 1404 has M antenna elements 1408 at locations $\{(\tilde{x}_i, \tilde{y}_i)\}_{i=1}^{M}$.

Methods according to aspects include a pre-computation phase, in which the virtual MIMO channel matrix $\hat{H} \in \mathbb{C}^{M \times N}$ is computed (by, for example, baseband processor 110 (FIG. 1)) as follows, assuming the arrays are perfectly aligned at a distance z from each other, where z is a parameter that can be chosen as described below.

$$\hat{h}_{ij} = \frac{z}{d_{ij}} e^{-j\frac{2\pi}{\lambda} d_{ij}} \quad (14)$$

where $\lambda$ is the wavelength, and $d_{ij}$ is the distance between the Rx antenna element i (1408) and TX antenna element j (1406), given by $$d_{ij} = \sqrt{(\tilde{x}_i - x_j)^2 + (\tilde{y}_i - y_j)^2 + z^2} \quad (15)$$

Note that the channel matrix defined above is normalized, and the actual channel matrix can be obtained by multiplying $\hat{H}$ by the path loss; however, this is immaterial for the pre-computation phase.

The pre-computation distance z is a design parameter and should be large enough to capture the correct properties of the channel. In general, the closer z is to the actual communication range, the better the scheme will perform; however, the actual communication range is usually not known in advance. As a rule of thumb, $z \approx d_R$, where $d_R$ is the Rayleigh distance:

$$d_R = \frac{D_{TX} D_{RX}}{\lambda} \quad (16)$$

The quantities $D_{TX}$ and $D_{RX}$ are the aperture diameters of the transmitter antenna array 1402 and a receiver antenna array 1404 respectively. The diameter of an antenna array given by element locations $\{(x_i,y_i)\}_{i=1}^N$ is defined by $$D = \max_{i,j \in \{1,\ldots,N\}} \sqrt{(x_i - x_j)^2 + (y_i - y_j)^2} \tag{17}$$

The singular value decomposition of $\hat{H}$ is computed:

$$\hat{H} = U\Sigma V^* \tag{18}$$

where $U \in \mathbb{C}^{M \times r}$ and $V \in \mathbb{C}^{N \times r}$ are matrices satisfying $U^*U = V^*V = I_r$, and $\Sigma \in \mathbb{R}^{r \times r}$ is a diagonal matrix with the non-negative singular values of $\hat{H}$ on the diagonal, ordered in descending order. Here, r is the rank of $\hat{H}$. Typically r<<min(M,N) for LoS massive MIMO.

In aspects, the pre-computation phase is performed only once and is part of the communication system design. The results are then stored on the transmitter and receiver (or only partial results, depending on the embodiment). The communication scheme, described below, uses the eigenvectors in U and V which correspond to OAM modes and the singular values $\Sigma$ (which were computed for the "virtual" channel), to multiplex several information streams, without the need to know the actual channel matrix H. This assumes that $\hat{H}$ can act as an approximation of H, up to some scaling (which depends on distance) and phased steering (depending on the angle between the transmitter antenna array 1402 and a receiver antenna array 1404). The angle can be measured with conventional techniques such as sector sweeping. The scaling can be deduced from SNR measurement, as described below. Note, however, that the scaling of the channel matrix is immaterial to the eigenvectors U and V, hence these can be used without any modifications.

In a subsequent, communication phase, the transmitter antenna array 1402 and a receiver antenna array 1404 follow a protocol to find out the desired TX and RX beam directions according to array orientations. For example, a codebook-based beamforming and exhaustive transmit and receiver search can be followed for beam alignment in which the transmitter performs sector sweeping to find best direction of transmission at receiver (while the receiver listens omni-directionally). The receiver will then report the best transmit direction to the transmitter. The receiver then performs sector sweeping to find the best direction of receiving (with the transmitter transmitting on the direction just found in the transmitter sector sweep). Receiver sector sweeping can be done virtually in zero time assuming the receiver has a fully digital millimeter-wave architecture.

Once sector sweeping and beamforming is performed, communication can occur in one of at least two ways. In a first communication method, according to aspects, the transmitter (e.g., transmitter section 191A (FIG. 1A)) uses the precoding matrix V to multiplex r independent data streams, with uniform power allocation across all r streams. Accordingly, the receiver (e.g., receiver section 191B (FIG. 1A)) performs post processing by multiplying the received signal by $U^*$. Recall that r is the rank of the "virtual" channel matrix $\hat{H}$ which was found at the pre-computation phase described earlier herein, which depends only on the array geometries and is known both at the transmitter and receiver before beginning of communication.

The effective channel matrix is of dimensions r×r, which is significantly smaller than the actual channel matrix dimensions, M×N. The receiver performs channel estimation based on this smaller effective channel matrix and subsequently decodes the signal using, for example, minimum mean-square error (MMSE) subsequent interference cancellation (SIC).

Alternatively, in a second communication method according to other aspects, water-filling (assigns power to multiple channels under a constant total power) is performed to perform power allocation without the need to perform channel estimation first. The receiver uses the selected TX and RX beams, determined from sector sweeping, to measure the SNR. The SNR can be approximated by the following expression:

$$SNR_{RX} = \frac{P}{N_0 W} \frac{|1^T \cdot H \cdot 1|^2}{M \cdot N} \tag{19}$$

where P is the total transmitted power, $N_0$ is the power spectral density of white noise, W is the system bandwidth, H is the actual (unknown) channel matrix, and 1 is an all-ones column vector.

The SNR measurement obtained at (19) is fed back to the transmitter. In practice, SNR might be measured over the reference/preamble symbols known between TX and RX. According to this second communication method, H is approximated as $$H \approx \rho \cdot \hat{H} \tag{20}$$

for some scalar $\rho$. Under this assumption, along with the approximation $\hat{h}_{ij} \sim 1$ (which holds if $z > d_R$):

$$SNR_{RX} \approx \frac{P}{N_0 W} |\rho|^2 MN \tag{21}$$

The approximation is used to scale the singular values of $\hat{H}$, found in the pre-computation phase, such that singular values approximate the eigenvalues of H. A water-filling algorithm is then applied on these approximated singular values. Specifically, the water-filling algorithm is used to solve the following optimization problem:

$$\text{maximum } \sum_{i=1}^{r} \log\left(1 + p_i \frac{SNR_{RX}}{rt} \hat{\sigma}_i^2\right) \tag{22}$$

$$\text{subject to } p_i \geq 0, i = 1, \ldots, r,$$

$$\sum_{i=1}^{r} p_i \leq 1$$

where $\hat{\sigma}_i$, i=1, . . . , r, are the singular values of $\hat{H}$ found in the pre-computation phase.

The transmitter uses the computed power allocation to multiplex r (or less, depending on the water-filling outcome) data streams using the matrix V found in the pre-computation phase. The receiver can apply MMSE-SIC demultiplexing using the matrix U.

Figure 16:
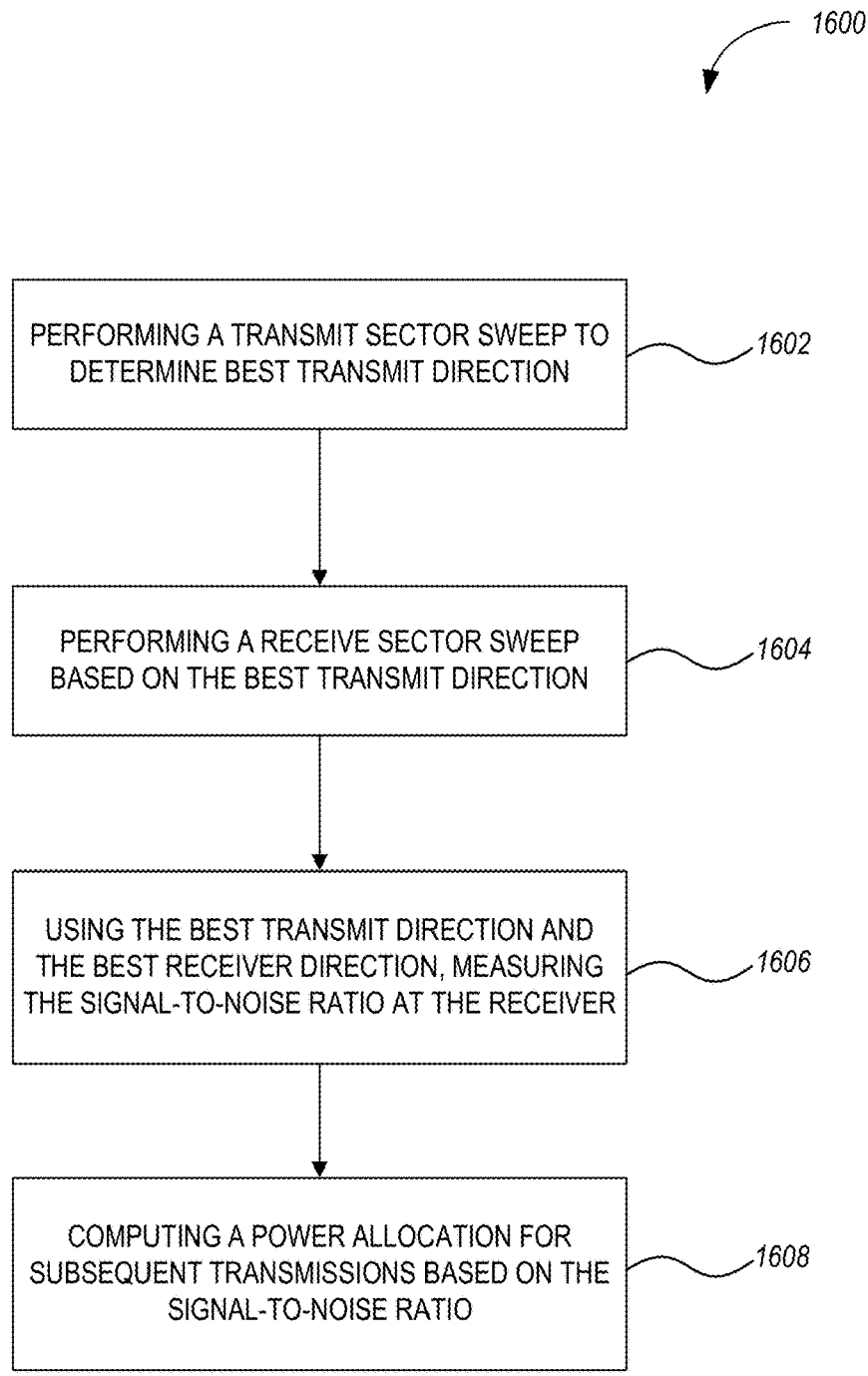
FIG. 16 illustrates a method for spatial multiplexing according to some aspects.

FIG. 16 illustrates a method 1600 for spatial multiplexing according to some aspects. In aspects, the method 1600 can be performed by processing circuitry (e.g., baseband processor 110 (FIG. 1), transmitter section 191A (FIG. 1A), receiver section 191B (FIG. 1A), etc.).

The method 1600 begins with operation 1602 with processing circuitry performing a transmit sector sweep to determine the best transmit direction. The method 1600 may continue with operation 1604 with processing circuitry performing a receive sector sweep based on the best transmit direction. Operations can also include MIMO detection of multiple streams subsequent to receive sector sweeping.

The method 1600 may continue with operation 1606 with processing circuitry using the best transmit direction and the best receiver direction to measure the signal-to-noise ratio at the receiver. Operation 1606 may proceed according to Equation (19) and accompanying description provided earlier herein.

The method 1600 may continue with operation 1608 with the processing circuitry computing a power allocation for subsequent transmissions based on the signal-to-noise ratio. Operation 1608 may proceed according to Equations (20)-(22) and accompanying description. Power allocation can be performed using a water-filling algorithm, which can be applied over multiplexed streams with an adaptive number of streams. The number of streams can also be based on the SNR. Power can be allocated to active streams and active streams can be determined based on the SNR.

The method 1600 can further include other operations such as generating a reduced channel matrix based upon geometry of a transmit antenna array and a receive antenna array of a communication device, according to Equations (14)-(18) and accompanying description provided earlier herein. An approximation of a full channel matrix can be generated based on this reduced channel matrix. A plurality of data streams can be multiplexed based on the reduced channel matrix. Precoders for the multiplexing can include Eigen vectors of a channel extracted from the reduced channel matrix. The reduced channel matrix may be based on a selected distance between the transmit antenna array and the receive antenna array. The distance can be estimated based on the SNR detected at the receiver.

Methods of Transmission Mode Switching for OAM and MIMO Systems

Orbital angular momentum (OAM) is an electromagnetic wave phenomenon in which a wave front propagates with helical phase fronts with 2 mm phase shifts, with m being an integer that represents the mode order. Various research works have demonstrated that OAM beams of different orders are orthogonal and therefore, ideally, do not interfere with each other. This means that an OAM beam of order m=0, for instance, does not interact with any other OAM mode order even with all modes propagating along the same axis within the same physical "free space" channel at essentially the same time. In reality, however, due to engineering limitations and channel impairments, OAM modes may experience crosstalk due to mode generation artifacts as well as channel multipath and reflection effects. In spite of these non-idealities, OAM is an excellent candidate transmission technology for high throughput data links in which there is line of sight between the transmitter and receiver, particularly short range communications like WiGig.

OAM is also favored in multipath-poor LoS scenarios because the mode crosstalk is minimal in which case and channel capacity is multiplied compared to a traditional spatially-multiplexed line of sight link (e.g., conventional MIMO).

Figure 17:
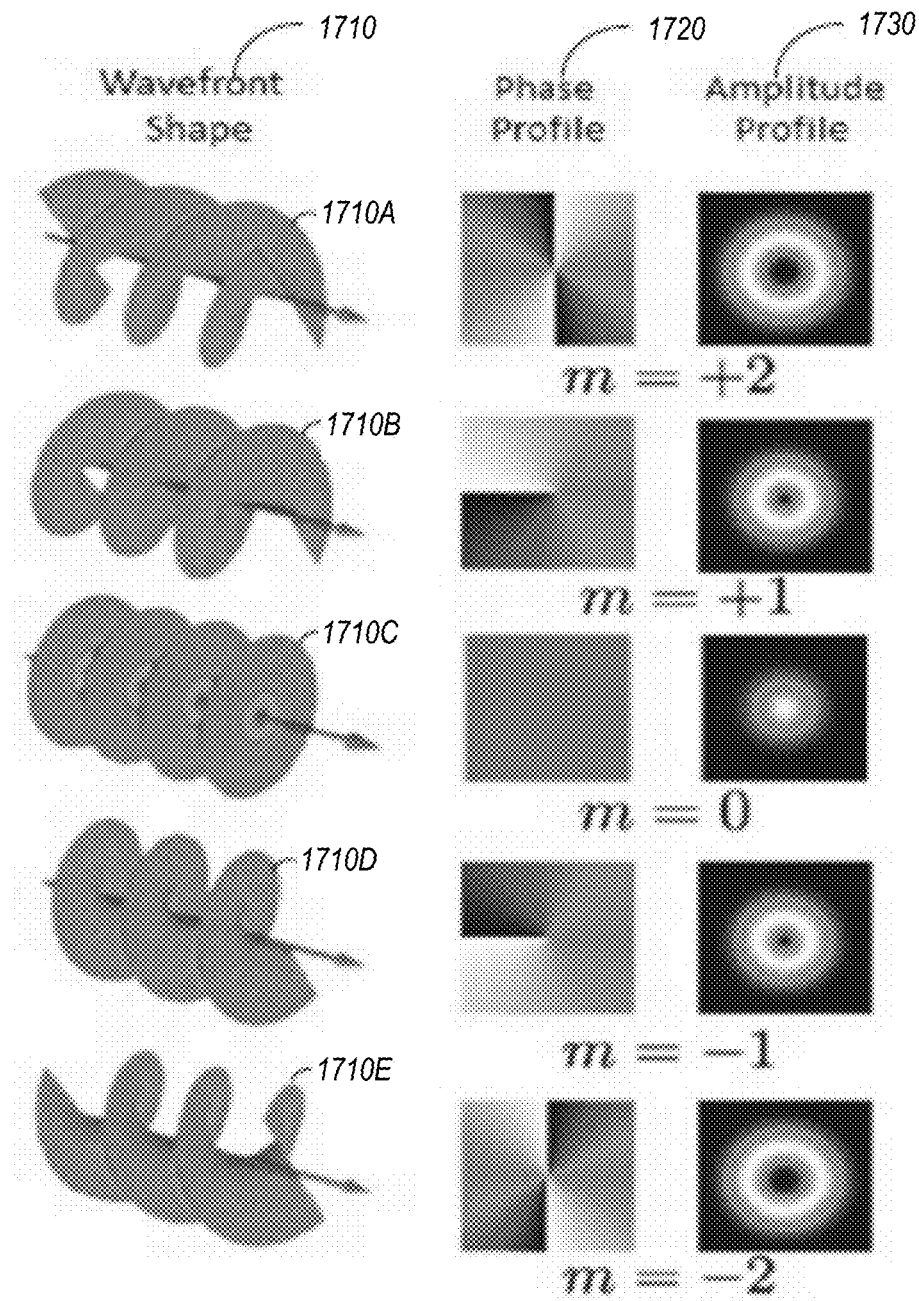
FIG. 17 illustrates several OAM modes in accordance with some embodiments.

FIG. 17 illustrates several OAM modes, in accordance with some aspects. The left column 1710 depicts OAM modes 1710a, 1710b, . . . , 1710e propagating in free space. The spiral propagation pattern of wavefronts can be observed. The middle column 1720 illustrates the phase profile of a planar cross section of the wavefront for each mode. The right column 1730 shows the amplitude profile for each of the propagating OAM wavefronts for each mode. To generate and receive OAM modes in wireless communication an appropriate radio system communication architecture would address OAM antenna topology, mode generation/reception topology and multi-OAM signaling. For example, OAM antenna topology could include a concentric antenna array to generate a number of OAM modes using patch antenna elements in accordance with some aspects. In some examples, concentric rings of circular antenna arrays can generate separate OAM modes. Each concentric antenna array ring would generate a different mode, the total number of modes desired dictate the number of concentric rings used. Each of the concentric antenna array rings could be made of any type of antenna element. For example, square patch antennas could be used. However, circular or other geometries of patch antennas may be used. Further, patch antennas are not a requirement as any type of antenna can be used. Furthermore, some aspects may use other than concentric rings of antennas.

Like a conventional wireless communication system, an OAM communication system comprises traditional system blocks such as the baseband components for digital signal processing, RF front end components comprising RF elements such as filters, amplifiers, local oscillators, mixers, and other components, and the antenna system.

The method of implementation of the OAM system determines the system architecture, depending on the OAM mode transmission technique. The OAM communication system may be used to transmit separate data streams across different OAM modes, or to transmit one single data stream across multiple modes in order to provide space diversity to mitigate a fading channel caused by multipath issues. Further, the system may be adaptable to a configuration in between these two transmission types. In one embodiment, n data streams could be mapped to n modes, which may be referred to as full multiplexing. In another embodiment, fewer than n data streams could be mapped to n OAM modes, providing partial diversity and partial multiplexing. In yet another embodiment one data stream could be mapped to n modes, which may be referred to as full diversity.

Multiplexing fewer streams to a higher number of modes will help improve mode separation through DSP, and is recommended when reliability is more important than throughput. Multiplexing the same number of streams to the same number of modes is a way of creating orthogonal diversity paths, and will be typically used when higher data rates are the priority. In general, OAM system architecture can be designed to allow one or more data signals to be multiplexed to one or more modes, ranging from full spatial multiplexing to diversity transmission. For easier demodulation and lower design complexity at the receiver, the transmitter can signal to the receiver how many data streams were multiplexed. In addition, the receiver can feed back demodulation quality information (through BER, for instance) so that transmitter can adapt the multiplexing order. The receiver can also feed back to the transmitter a recommendation of how many multiplexing streams to transmit since it has knowledge of the quality of all the OAM modes it receives.

Multiple stream transmission has typically been done through MIMO antenna configurations in wireless communication, with n antennas at the transmitter and n antennas at the receiver, and n streams transmitted simultaneously from the transmitter as independent different data streams. Within the channel the streams interfere with each other, but they are de-multiplexed at the receiver using channel inversion and signal processing techniques.

In millimeter-wave implementations, there are two main differences between MIMO and OAM. Millimeter-wave signals reflect poorly off structures; therefore, it is difficult to obtain a sufficient number of independent signal paths necessary to obtain good MIMO channels. While MIMO thrives in multipath-rich channels, OAM thrives in multipath-poor line-of-sight (LoS) environments. In multipath-poor line-of-sight (LoS) environments, OAM modes propagate along the same axis with minimal cross-mode interference.

A variety of beamforming and spatial multiplexing techniques can be used to maximize channel capacity between transmitter and receiver. As is appreciated from at least the above description, some physical channel conditions are well-suited to OAM, but other conditions would be better suited to beamforming or other propagation schemes to achieve higher total channel capacity. Methods according to some aspects provide a flexible transmission scheme to maximize data throughput by switching between beamforming, MIMO and OAM modes depending on channel conditions to maximize system throughput. Receiver feedback may be used to estimate the channel and select the appropriate signaling scheme. Accordingly, methods and apparatuses according to aspects use closed-loop signaling. Furthermore, channels may randomly change as a function of time; therefore the estimated channel information would be used to adaptively determine if either beamforming or one of a number of OAM transmission methods should be selected.

In millimeter-wave systems such as in WiGig, beamforming is used to point directional high-gain beams for communication between transceivers to largely offset the high path loss associated with millimeter-wave transmission. Due to the larger available bandwidth at millimeter wave frequencies (for example, WiGig has 7 GHz bandwidth within the 60-GHz transmission band), communication at these frequencies is desirable because high data throughputs can be obtained on the wide frequency channels of transmission. In a user device, beamforming is implemented by connecting a given number of RF chains to a given number of closely-spaced antenna elements. The phasing across the antenna elements will determine the direction of beamforming. In a beamforming system, the receiver feeds back channel quality metrics to the transmitter in order to best determine the best direction to point the high-gain beam.

For traditional beamforming, only one single data stream can be sent along the path of the beam. An intelligent transmission scheme according to aspects can opportunistically switch between beamforming and a combination of OAM modes, to achieve maximum total channel capacity. Also, in a rich scattered environment, a system according to aspects can switch between OAM, beamforming, and MIMO multiplexing/diversity modes depending on the channel quality and condition.

The description that follows assumes that: 1.) for a given distance between a transmitter and a receiver, OAM modes experience different pathlosses; 2.) higher OAM modes see higher pathloss; 3.) OAM mode 0 is equivalent to traditional beamforming; 4.) if the channel is LoS, OAM modes can be assumed orthogonal with no cross-talk; if the channel is non-LoS, there is high chance of OAM modes cross interference. Therefore, it follows that a rich scattered channel can benefit from MIMO multiplexing or diversity.

Given the available OAM modes and knowing the channel state (whether LoS or non-LoS, for example), methods according to aspects select a subset of available OAM modes (including beamforming) and allocate available transmit power to active OAM modes. For a LOS channel, since OAM modes are orthogonal, water-filling can optimally select OAM modes and their corresponding allocated powers.

Figure 18:
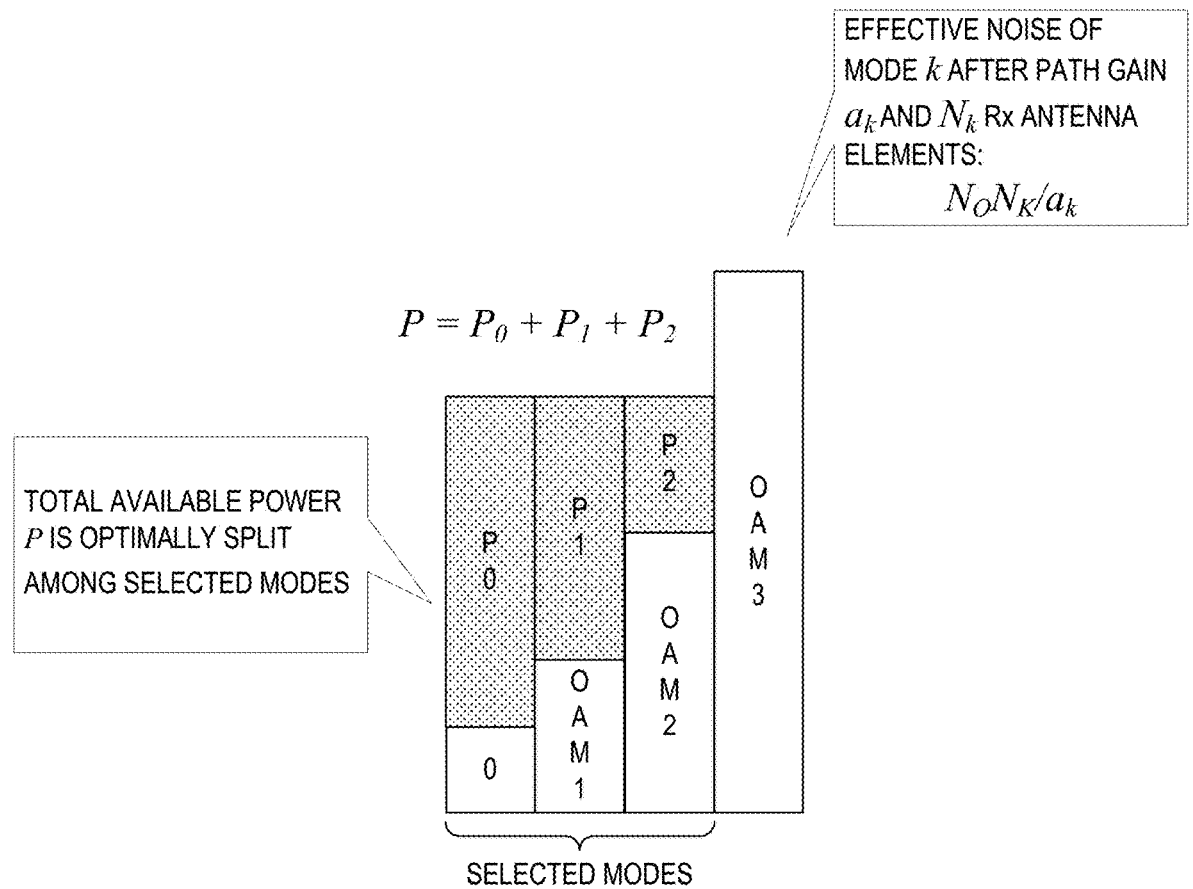
FIG. 18 illustrates orbital angular momentum (OAM) mode selection and power allocation with water-filling according to some aspects.

FIG. 18 illustrates OAM node selection and power allocation with water-filling according to some aspects. Four OAM modes are shown: OAM Mode 0 (which is equivalent to traditional beamforming), Mode 1, Mode 2 and Mode 3. Total Power P is optimally allocated as shown, such that OAM Mode 0 is allocated $P_0$ power, Mode 1 is allocated $P_1$ power and Mode 2 is allocated $P_2$ power, assuming that OAM Mode 3 is inactive (assuming noise on the channel indicates that OAM Mode 3 should be inactive). In some aspects, power can be split evenly among selected modes, or all modes may be made active and the power split evenly among them. In some aspects, beamforming only will be performed and only OAM Mode 0 will be active, for example. Path loss can increase with distance and path loss can increase as OAM Mode increases.

OAM modes can be realized using antenna arrays. The number of receive antenna elements determines the effective noise power after OAM/beamforming combining at the receiver. The number of antenna elements can be 1, 4, 8 and 12 for OAM mode 0, 1, 2 and 3, respectively. In general, the SNR of mode k after transmitter and receiver OAM/beamforming combining is:

$$SNR_k = \frac{P_k \alpha_k}{N_k N_0} \quad (23)$$

where $P_k$ is transmit power allocated to mode k, $\alpha_k$ is effective path gain of OAM mode k including OAM/beamforming processing gain at the transmitter and receiver, and $N_k$ is the number of antenna elements for OAM mode k reception. It will be noted that the total power equals the sum of transmit powers allocated to all the active modes.

If all OAM modes are kept active regardless of SNR, then beamforming outperforms OAM in low-SNR ranges. OAM outperforms beamforming at shorter distances and OAM performance converges to beamforming performance if smart mode selection and water-filling is applied. With longer distances, non-LoS conditions are more likely to occur, in which case cross-talk orthogonality of OAM fails and OAM should not be selected.

Figure 19A:
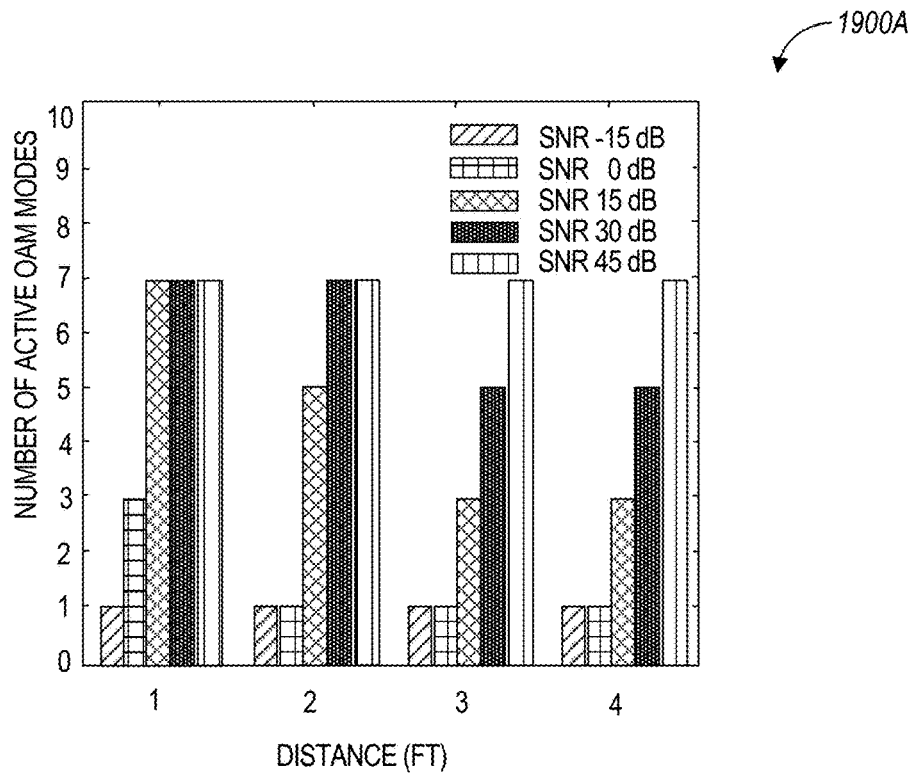
FIG. 19A illustrates OAM mode selection based on signal-to-noise ratio (SNR) and distance between a transmitter and a receiver when one antenna element is used per OAM mode according to some aspects.
Figure 19B:
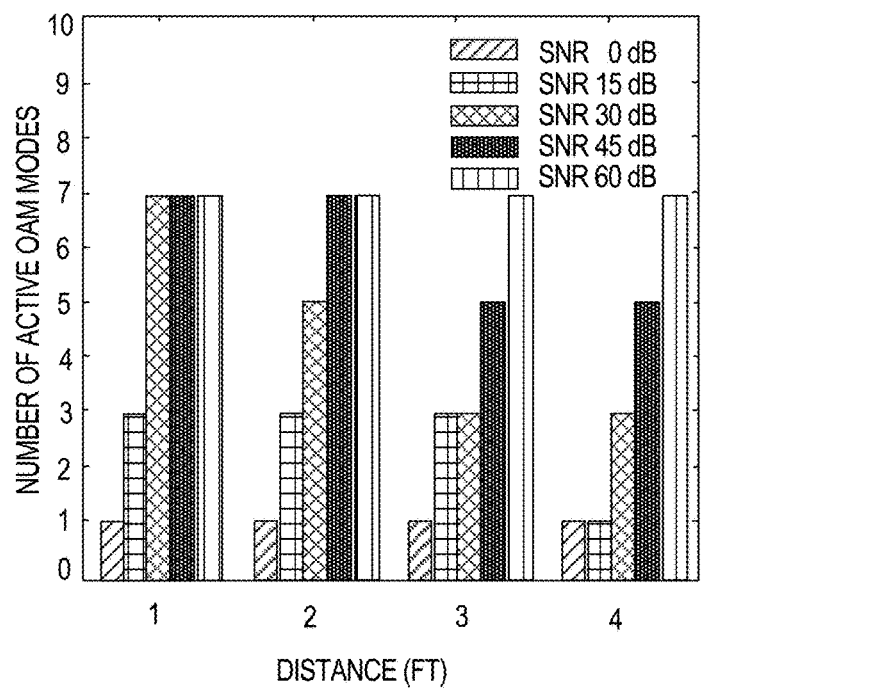
FIG. 19B illustrates OAM mode selection based on signal-to-noise ratio (SNR) and distance between a transmitter and a receiver when a varying number of antenna elements is used per OAM mode according to some aspects.

FIG. 19A illustrates OAM mode selection based on signal-to-noise ratio (SNR) and distance between a transmitter and a receiver when one antenna element is used per OAM mode according to some aspects. FIG. 19B illustrates OAM mode selection based on signal-to-noise ratio (SNR) and distance between a transmitter and a receiver when a varying number of antenna elements is used per OAM mode according to some aspects. In both figures, it can be seen that the number of active OAM modes increase with SNR and diminishes with distance increase.

Figure 20:
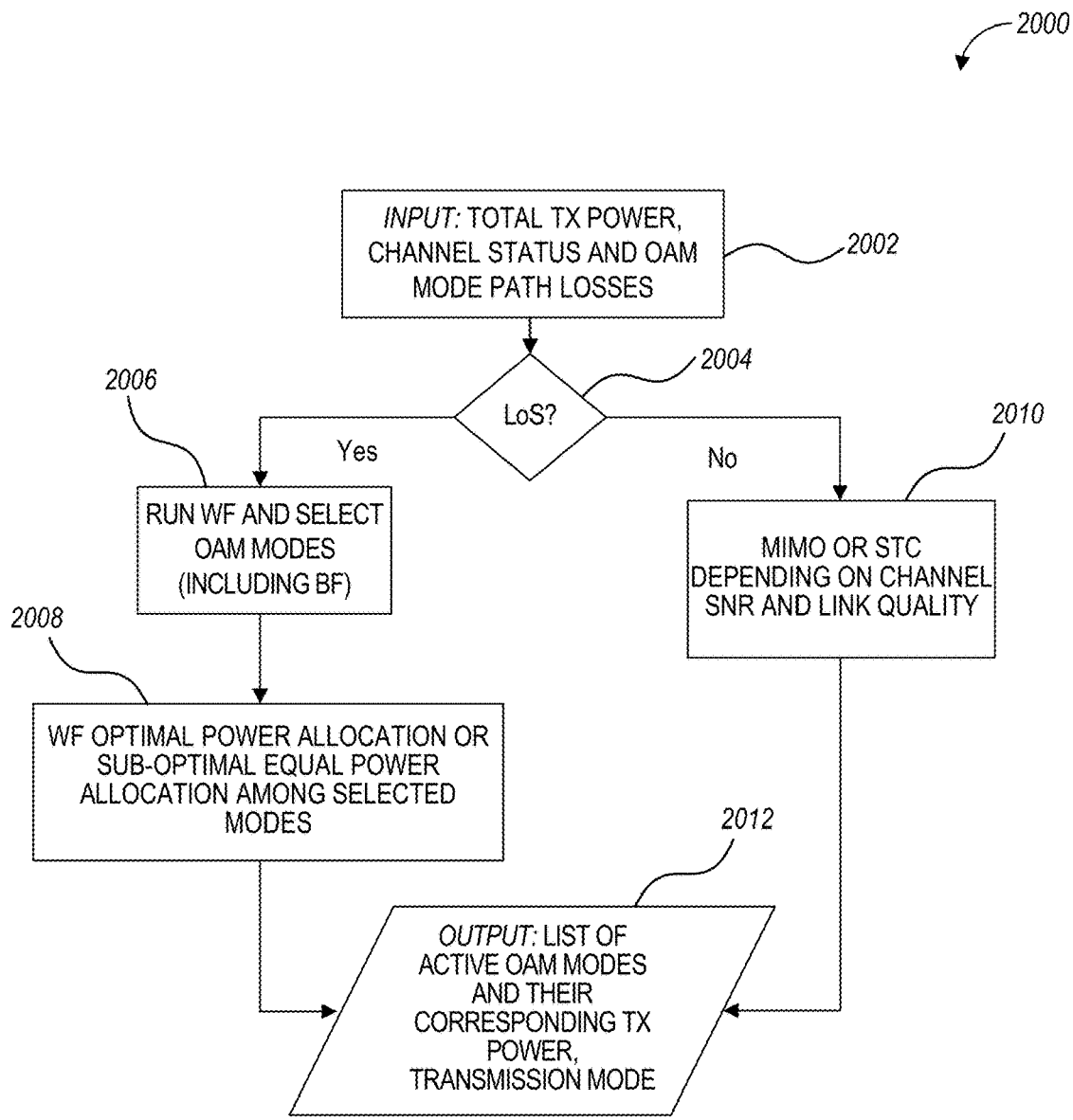
FIG. 20 illustrates a flowchart of a method for transmission mode switching according to some aspects.

FIG. 20 illustrates a flowchart of a method 2000 for transmission mode switching according to some aspects. In aspects, the method 2000 can be performed by processing circuitry (e.g., baseband processor 110 (FIG. 1), transmitter section 191A (FIG. 1A), receiver section 191B (FIG. 1A), etc.).

The method 2000 can begin with operation 2002 with the processing circuitry receiving inputs, including the total transmit power, channel status, and OAM mode path losses, among other inputs. Operations of the method 2000 can be performed periodically, upon determining dropped data packets or other sub-optimal channel conditions, etc.

The method 2000 can continue with operation 2004 with the processing circuitry determining whether communications are LoS. This can be determined based on distance to receiver, channel status, and detected path losses, for example. However, aspects are not limited thereto. If communications are LoS, the processing circuitry will perform water-filling and select the number of OAM modes in operation 2006. The processing circuitry performs power allocation in operation 2008. Operation 2008 can proceed in a manner similarly to that described above with reference to FIG. 18 and accompanying text. The processing circuitry If communications are not LoS, then other transmission modes are selected (e.g., MIMO or space-time code (STC) communications) in operation 2010. In any case, the result of method 2000 can include data 2012, stored in memory of a communication device, for example, as to which and how many OAM modes are selected, corresponding transmit power allocation, transmission modes, and other transmission-related data.

Other Apparatuses

Figure 21:
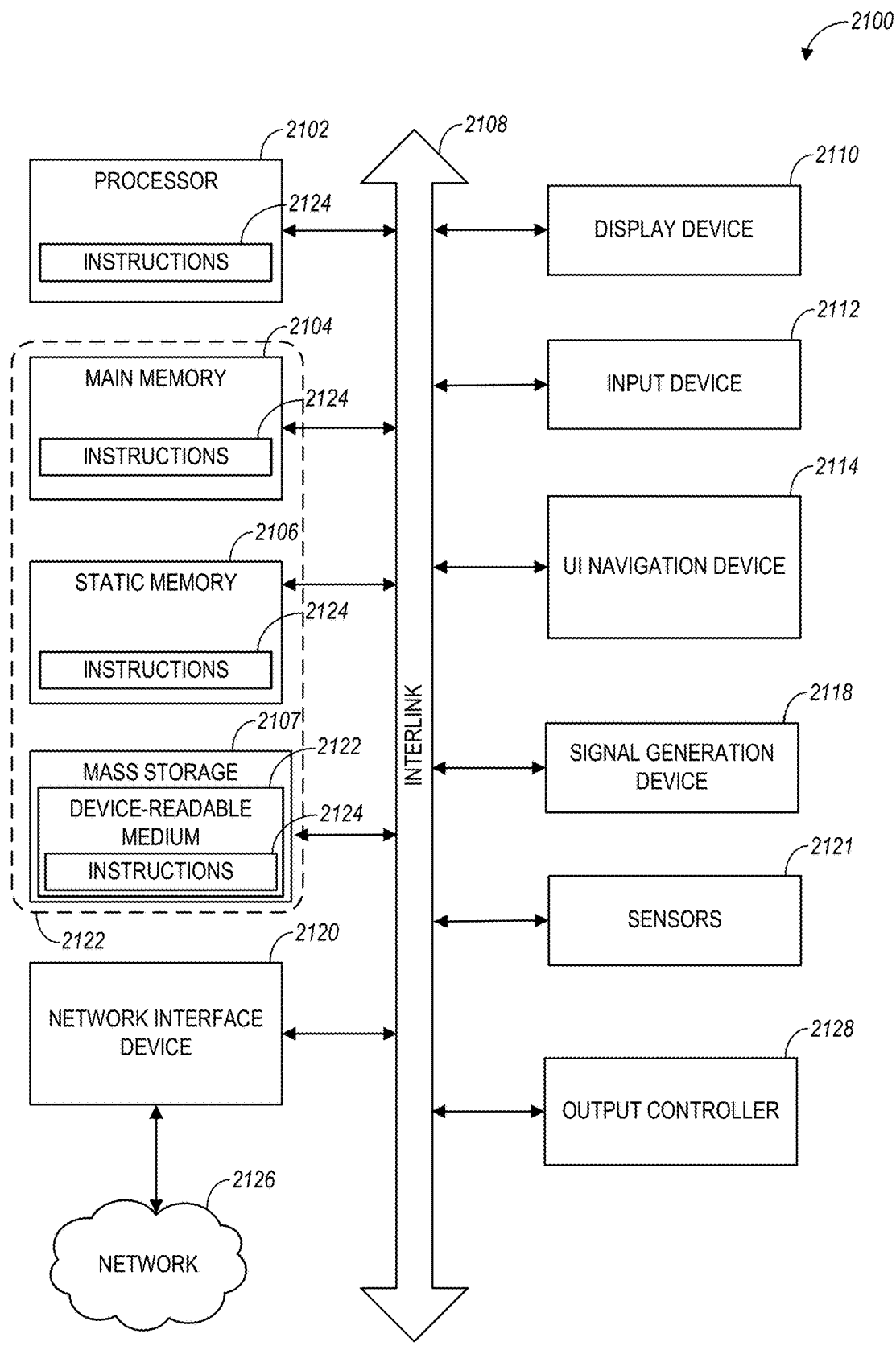
FIG. 21 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 21 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 2100 may operate as a standalone device or may be connected (e.g., networked) to other communication devices.

Circuitry (e.g., processing circuitry) is a collection of circuits implemented in tangible entities of the device 2100 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in the first circuit of a first circuitry at one point in time and reused by a second circuit in the first circuitry, or by a third circuit in a second circuitry at a different time. Additional examples of these components with respect to the device 3200 follow.

In some aspects, the device 2100 may operate as a standalone device or may be connected (e.g., networked) to other devices. In a networked deployment, the communication device 2100 may operate in the capacity of a server communication device, a client communication device, or both in server-client network environments. In an example, the communication device 2100 may act as a peer communication device in peer-to-peer (P2P) (or other distributed) network environment. The communication device 2100 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 2100 may include a hardware processor 2102 (e.g., a central processing unit (CPU), a graphics processing unit (GPU), a hardware processor core, or any combination thereof), a main memory 2104, a static memory 2106, and mass storage 2107 (e.g., hard drive, tape drive, flash storage, or other block or storage devices), some or all of which may communicate with each other via an interlink (e.g., bus) 2108.

The communication device 2100 may further include a display device 2110, an alphanumeric input device 2112 (e.g., a keyboard), and a user interface (UI) navigation device 2114 (e.g., a mouse). In an example, the display device 2110, input device 2112 and UI navigation device

2114 may be a touchscreen display. The communication device 2100 may additionally include a signal generation device 2118 (e.g., a speaker), a network interface device 2120, and one or more sensors 2121, such as a global positioning system (GPS) sensor, compass, accelerometer, or another sensor. The communication device 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2107 may include a communication device-readable medium 2122, on which is stored one or more sets of data structures or instructions 2124 (e.g., software) embodying or utilized by any one or more of the techniques or functions described herein. In some aspects, registers of the processor 2102, the main memory 2104, the static memory 2106, and/or the mass storage 2107 may be, or include (completely or at least partially), the device-readable medium 2122, on which is stored the one or more sets of data structures or instructions 2124, embodying or utilized by any one or more of the techniques or functions described herein. In an example, one or any combination of the hardware processor 2102, the main memory 2104, the static memory 2104, or the mass storage 2116 may constitute the device-readable medium 2122.

As used herein, the term "device-readable medium" is interchangeable with "computer-readable medium" or "machine-readable medium". While the communication device-readable medium 2122 is illustrated as a single medium, the term "communication device-readable medium" may include a single medium or multiple media (e.g., a centralized or distributed database, and/or associated caches and servers) configured to store the one or more instructions 2124. The term "communication device-readable medium" is inclusive of the terms "machine-readable medium" or "computer-readable medium", and may include any medium that is capable of storing, encoding, or carrying instructions (e.g., instructions 2124) for execution by the communication device 2100 and that cause the communication device 2100 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2124 may further be transmitted or received over a communications network 2126 using a transmission medium via the network interface device 2120 utilizing any one of a number of transfer protocols. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input-multiple-output (SIMO), MIMO, or multiple-input-single-output (MISO) techniques. In some examples, the network interface device 2120 may wirelessly communicate using Multiple User MIMO techniques.

The term "transmission medium" shall be taken to include any intangible medium that is capable of storing, encoding or carrying instructions for execution by the communication device 2100, and includes digital or analog communications signals or another intangible medium to facilitate communication of such software. In this regard, a transmission medium in the context of this disclosure is a device-readable medium.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions. Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE802.11ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHZ)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radiotelephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks associated with, e.g., mmWave and sub-mmWave-based communications.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band above 45 Gigahertz (GHz), e.g., 60 GHz or within a terahertz frequency band (e.g., between 300 GHz and 10 THz). However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHZ, a frequency band below 20 GHz, e.g., a Sub 1 GHz (SIG) band, a 2.4 GHz band, a 5 GHZ band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in the circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read-only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QOS) basic service set (BSS), a tunneled direct-link setup (TDLS) link, a STA-to-STA communication in an independent basic service set (IBSS), or the like.

Some demonstrative aspects are described herein with respect to WiFi communication. However, other aspects may be implemented with respect to any other communication scheme, network, standard and/or protocol.

In some demonstrative aspects, a wireless communication device may implement a millimeter-wave (mmWave) or sub-mmWave radio front-end module (RFEM), e.g., as described above.

Millimeter-wave may be defined as a frequency range spanning about 30 GHz to about 300 GHz, and in practice currently covers several discrete licensed and unlicensed frequency bands. Sub-millimeter wave may be defined as a frequency range spanning in the terahertz band (0.3 THz to 10 THz). Similar to mmWave communications, sub-mmWave communications in the terahertz bands can be used as mobile backhaul for transferring large bandwidth signals between base stations as well as chip-to-chip communications.

The unlicensed mmWave frequency band currently available is in the vicinity of 60 GHz. Licensed frequency bands are likely to include 28 GHZ, 39 GHz, 73 GHZ, and 120 GHz. The availability of these bands and the specific frequency range of each varies by regulatory jurisdiction, and in some cases (specifically for licensed band operation) there is still significant uncertainty as to regulations in some countries. Communication trials using sub-mmWave communications in the terahertz bands are ongoing. Challenges associated with mmWave-based and sub-mmWave-based communications include increased power consumption, limited range, signal loss because of the use of regular cables instead of traces, and challenges with integrating multiple antennas for beamforming. Some of these challenges (e.g., as relating to increased power consumption of sub-mmWave communication systems operating in the terahertz bands) are addressed in the present disclosure as discussed earlier herein in accordance with some aspects.

Additional Notes & Examples

Additional examples of the presently described method, system, and device embodiments include the following, non-limiting configurations. Each of the non-limiting examples may stand on its own or may be combined in any permutation or combination with any one or more of the other examples provided above or throughout the present disclosure.

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a communication device, comprising: an antenna array; and processing circuitry coupled to the antenna array and configured to initialize a beam tracking algorithm based on received signals received at the antenna array, wherein antenna phases used in the beam tracking are based on a predetermined set of limits including an upper phase limit and a lower phase limit, to generate a beam tracking result generate a calibration vector based on the beam tracking result; and receive subsequent transmissions using a codebook adapted based on the calibration vector.

In Example 2, the subject matter of Example 1 includes wherein the processing circuitry is further configured to compute a phase difference between a best beam direction and the beam tracking result; and wherein the calibration vector is based on the phase difference.

In Example 3, the subject matter of any of Examples 1-2 includes wherein at least one of the upper phase limit and the lower phase limit are set based on a maximum phase error that can be generated due to thermal heating.

In Example 4, the subject matter of any of Examples 1-3 includes wherein at least one of the upper phase limit and the lower phase limit are set based upon a maximum divergence of an antenna element of the antenna array.

In Example 5, the subject matter of any of Examples 1-4 includes wherein the received signals do not include a pilot signal.

In Example 6, the subject matter of any of Examples 1-5 includes wherein the beam tracking algorithm is based on antenna weights that maximize output power of signals output by the processing circuitry.

In Example 7, the subject matter of Example 6 includes wherein the beam tracking algorithm includes an Equal Gain Combining technique.

In Example 8, the subject matter of any of Examples 1-7 includes wherein the apparatus is included in a fully-digital receiver.

Example 9 is an apparatus of a communication device, comprising: an antenna array; and baseband circuitry coupled to the antenna array and configured to perform a transmit sector sweep to determine best transmit direction; perform a receive sector sweep based on the best transmit direction; using the best transmit direction and the best receiver direction, measure the signal-to-noise ratio at the receiver; and compute a power allocation for subsequent transmissions based on the signal-to-noise ratio.

In Example 10, the subject matter of Example 10 includes wherein the baseband circuitry is further configured to generate a reduced channel matrix based upon geometry of a transmit antenna array and a receive antenna array of a communication device.

In Example 11, the subject matter of Example 10 includes wherein the baseband circuitry is further configured to generate an approximation of a full channel matrix based on the reduced channel matrix.

In Example 12, the subject matter of Example 10 includes wherein the baseband circuitry is further configured to multiplex a plurality of data streams based on the reduced channel matrix.

In Example 13, the subject matter of Example 12 includes wherein precoders for the multiplexing are Eigen vectors of a channel extracted from the reduced channel matrix.

In Example 14, the subject matter of Example 10 includes wherein the reduced channel matrix is further based on a selected distance between the transmit antenna array and the receive antenna array.

In Example 15, the subject matter of Example 14 includes wherein the baseband circuitry is further configured to estimate the distance based on the signal-to-noise ratio.

In Example 16, the subject matter of any of Examples 9-15 includes wherein computing the power allocation includes executing a water-filling algorithm.

In Example 17, the subject matter of Example 16 includes wherein the water-filling is applied over multiplexed streams with an adaptive number of streams.

In Example 18, the subject matter of Example 17 includes wherein the adaptive number of streams is based on the signal-to-noise ratio.

In Example 19, the subject matter of any of Examples 9-18 includes wherein power is equally allocated to active streams.

In Example 20, the subject matter of Example 19 includes wherein the number of active streams is determined based on the signal-to-noise ratio.

In Example 21, the subject matter of any of Examples 9-20 includes wherein the baseband circuitry is further configured to perform MIMO detection of multiple streams subsequent to receive sector sweeping.

Example 22 is an apparatus of a communication device, the apparatus comprising: an array of antenna elements, the array arranged to generate at least one orbital angular momentum (OAM) mode; and processing circuitry coupled to the antenna array and configured to detect whether communications to a neighboring device are line-of-sight (LoS) based on at least one of detected path loss and channel status; and responsive to detecting that communications is LoS, select a number of OAM modes for subsequent transmissions.

In Example 23, the subject matter of Example 22 includes wherein the processing circuitry is further configured to allocate power among the number of selected OAM modes.

In Example 24, the subject matter of Example 23 includes wherein the allocation is according to a water-filling algorithm.

What is claimed is:

1. An apparatus of a multiple-input-multiple-output (MIMO) communication device, the apparatus comprising:
   a MIMO antenna array of antenna elements, the MIMO antenna array comprising a receiver antenna array and a transmitter antenna array; and
   processing circuitry coupled to the MIMO antenna array and configured to:
      apply calibration to a plurality of receive beams to obtain a plurality of phase constraints, the plurality of receive beams associated with input signals received by the receiver antenna array from a neighboring device, and the calibration based on a beamforming matrix of the input signals;
      perform baseband processing on a subset of the input signals to generate processed input signals, the subset of the input signals received via a subset of the plurality of receive beams associated with the phase constraints;
      detect whether communications to the neighboring device are line-of-sight (LoS) communications based on at least one of detected path loss and channel status; and
      responsive to the detecting, select a transmission mode for transmitting output signals to the neighboring device via the transmitter antenna array, the output signals based on the processed input signals.

2. The apparatus of claim 1, wherein the MIMO antenna array is arranged to generate at least one orbital angular momentum (OAM) mode of a plurality of OAM modes.

3. The apparatus of claim 2, wherein the processing circuitry is to:
   detect that the communications to the neighboring device are LoS communications.

4. The apparatus of claim 3, wherein the processing circuitry is to:
   select a number of OAM modes of the plurality of OAM modes as the transmission mode for subsequent transmissions of the output signals.

5. The apparatus of claim 4, wherein the processing circuitry is to:
   allocate power among the number of selected OAM modes.

6. The apparatus of claim 5, wherein the allocation of power is according to a water filling (WF) algorithm.

7. The apparatus of claim 1, wherein the processing circuitry is to:
   detect that the communications to the neighboring device are not LoS communications; and
   select one of a MIMO communication mode or space-time code (STC) communication mode as the transmission mode for subsequent transmissions of the output signals.

8. The apparatus of claim 1, wherein the processing circuitry is to:
   generate beam boundaries for the plurality of receive beams based on the phase constraints; and
   select the subset of the plurality of receive beams based on the beam boundaries.

9. The apparatus of claim 1, wherein the processing circuitry is to:
   generate during the calibration, a plurality of beamforming vectors based on a calibration vector.

10. The apparatus of claim 9, wherein the processing circuitry is to:
    update the calibration vector based on the phase constraints; and
    perform tracking of the subset of the plurality of receive beams based on beamforming directions of the subset of the input signals and a diagonalization function of the calibration vector.

11. The apparatus of claim 1, comprising:
    a system on chip (SoC), the SoC comprising an integrated circuit (IC) with the processing circuitry, the processing circuitry including two or more of front-end circuitry, beam calibration circuitry, spatial compensation circuitry, and baseband processing circuitry.

12. The apparatus of claim 11, further comprising a connector coupled to the IC, wherein the connector conforms with at least one of Universal Serial Bus (USB), High-Definition Multimedia Interface (HDMI), Thunderbolt, Peripheral Component Interconnect Express (PCIe), and Ethernet specifications.

13. The apparatus of claim 1, wherein the calibration to the plurality of receive beams is a closed-loop calibration.

14. A system comprising:
    an antenna array comprising a receiver antenna array and a transmitter antenna array;
    a receiver coupled to the receiver antenna array, the receiver to:
       apply a calibration to a plurality of receive beams to obtain a plurality of phase constraints, the plurality of receive beams associated with input signals received by the receiver antenna array from a neighboring device, and the calibration based on a beamforming matrix of the input signals; and
       perform baseband processing on a subset of the input signals to generate processed input signals, the subset of the input signals received via a subset of the plurality of receive beams associated with the phase constraints; and a transmitter coupled to the transmitter antenna array, the transmitter to:
- detect whether communications to the neighboring device are line-of-sight (LoS) communications based on at least one of detected path loss and channel status; and
- responsive to the detecting, select a transmission mode for transmitting output signals to the neighboring device via the transmitter antenna array, the output signals based on the processed input signals.

15. The system of claim 14, wherein the antenna array is arranged to generate at least one orbital angular momentum (OAM) mode of a plurality of OAM modes, and wherein the transmitter is to:
- detect that the communications to the neighboring device are LoS communications;
- select a number of OAM modes of the plurality of OAM modes as the transmission mode for subsequent transmissions of the output signals; and
- allocate power among the number of selected OAM modes.

16. A method comprising:
- applying calibration to a plurality of receive beams to obtain a plurality of phase constraints, the plurality of receive beams associated with input signals received by a receiver antenna array of a multiple-input-multiple-output (MIMO) antenna array from a neighboring device, and the calibration based on a beamforming matrix of the input signals;
- performing baseband processing on a subset of the input signals to generate processed input signals, the subset of the input signals received via a subset of the plurality of receive beams associated with the phase constraints;
- detecting whether communications to the neighboring device are line-of-sight (LoS) communications based on at least one of detected path loss and channel status; and
- responsive to the detecting, selecting a transmission mode for transmitting output signals to the neighboring device via a transmitter antenna array of the MIMO antenna array, the output signals based on the processed input signals.

17. The method of claim 16, wherein the MIMO antenna array is arranged to generate at least one orbital angular momentum (OAM) mode of a plurality of OAM modes, and the method further comprising:
- detecting that the communications to the neighboring device are LoS communications;
- selecting a number of OAM modes of the plurality of OAM modes as the transmission mode for subsequent transmissions of the output signals; and
- allocating power among the number of selected OAM modes.

18. The method of claim 17, wherein the allocation of power is according to a water filling (WF) algorithm.

19. The method of claim 16, further comprising:
- detecting that the communications to the neighboring device are not LoS communications; and
- selecting one of a MIMO communication mode or space-time code (STC) communication mode as the transmission mode for subsequent transmissions of the output signals.

20. The method of claim 16, further comprising:
- generating during the calibration, a plurality of beamforming vectors based on a calibration vector;
- updating the calibration vector based on the phase constraints; and
- performing tracking of the subset of the plurality of receive beams based on beamforming directions of the subset of the input signals and a diagonalization function of the calibration vector.

* * * * *